(12) United States Patent
Tazaki et al.

(10) Patent No.: US 10,967,797 B2
(45) Date of Patent: Apr. 6, 2021

(54) VIDEO DISPLAY MIRROR AND VIDEO DISPLAY MIRROR SYSTEM

(71) Applicant: Nissan Motor Co., Ltd., Kanagawa (JP)

(72) Inventors: Yuichi Tazaki, Kanagawa (JP); Yuji Matsumoto, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 16/404,411

(22) Filed: May 6, 2019

(65) Prior Publication Data

US 2019/0275947 A1 Sep. 12, 2019

Related U.S. Application Data

(63) Continuation of application No. 14/358,192, filed as application No. PCT/JP2012/077890 on Oct. 29, 2012, now abandoned.

(30) Foreign Application Priority Data

Dec. 9, 2011 (JP) ................................ 2011-269734
Jun. 12, 2012 (JP) ................................ 2012-132789

(51) Int. Cl.
*B60R 1/12* (2006.01)
*B60R 1/04* (2006.01)
(Continued)

(52) U.S. Cl.
CPC .................. *B60R 1/12* (2013.01); *B60R 1/00* (2013.01); *B60R 1/04* (2013.01); *B60R 1/08* (2013.01); *B60R 2001/1253* (2013.01); *B60R 2011/0033* (2013.01); *B60R 2300/207* (2013.01); *B60R 2300/8006* (2013.01);
(Continued)

(58) Field of Classification Search
CPC .... B60R 1/12; B60R 1/00; B60R 1/04; B60R 2011/0033; B60R 2300/8026; B60R 2300/8066; B60R 2001/1253; H04N 7/181
See application file for complete search history.

(56) References Cited

U.S. PATENT DOCUMENTS 5,956,181 A * 9/1999 Lin .......................... B60R 1/12
359/630
8,154,418 B2 * 4/2012 Peterson .................. B60R 1/12
340/815.4
(Continued)

FOREIGN PATENT DOCUMENTS

EP    1176056 A2    1/2002
GB    2406841 A     4/2005
(Continued)

*Primary Examiner* — Boubacar Abdou Tchoussou
(74) *Attorney, Agent, or Firm* — Osha Bergman Watanabe & Burton LLP

(57) ABSTRACT

A video display mirror is provided with a half mirror, a monitor, and an interlocking mechanism. The half mirror is used so that a vehicle passenger can look toward the rear of the vehicle. The monitor is disposed near the half mirror toward the front of the vehicle. The interlocking mechanism moves in relation to a video image being displayed on the monitor and changes the angle of a reflection surface of the half mirror from the position of the half mirror when the rear of the vehicle is viewed.

8 Claims, 19 Drawing Sheets

(51) Int. Cl.
  *B60R 1/00* (2006.01)
  *B60R 1/08* (2006.01)
  *B60R 11/00* (2006.01)
  *H04N 7/18* (2006.01)

(52) U.S. Cl.
  CPC ............ *B60R 2300/8026* (2013.01); *B60R 2300/8066* (2013.01); *H04N 7/18* (2013.01)

(56) References Cited

U.S. PATENT DOCUMENTS

| | | | |
|---|---|---|---|
| 8,704,892 B2 * | 4/2014 | Taguchi | B60R 1/06 348/148 |
| 2002/0011927 A1 | 1/2002 | Lang et al. | |
| 2002/0141086 A1 | 10/2002 | Lang et al. | |
| 2004/0027694 A1 | 2/2004 | Lin | |
| 2004/0027695 A1 | 2/2004 | Lin | |
| 2007/0132567 A1 | 6/2007 | Schofield et al. | |
| 2009/0015736 A1 | 1/2009 | Weller et al. | |
| 2009/0243824 A1 * | 10/2009 | Peterson | B60R 1/12 340/435 |
| 2012/0140074 A1 * | 6/2012 | Taguchi | B60R 1/12 348/148 |

FOREIGN PATENT DOCUMENTS

| | | |
|---|---|---|
| JP | 2002-096685 A | 4/2002 |
| JP | 2002-120649 A | 4/2002 |
| JP | 2005-534556 A | 11/2005 |
| JP | 3140339 U | 3/2008 |
| JP | 2010-143250 A | 7/2010 |
| JP | 2010-163104 A | 7/2010 |
| JP | 3161007 U | 7/2010 |
| TW | M243653 U | 9/2004 |

\* cited by examiner

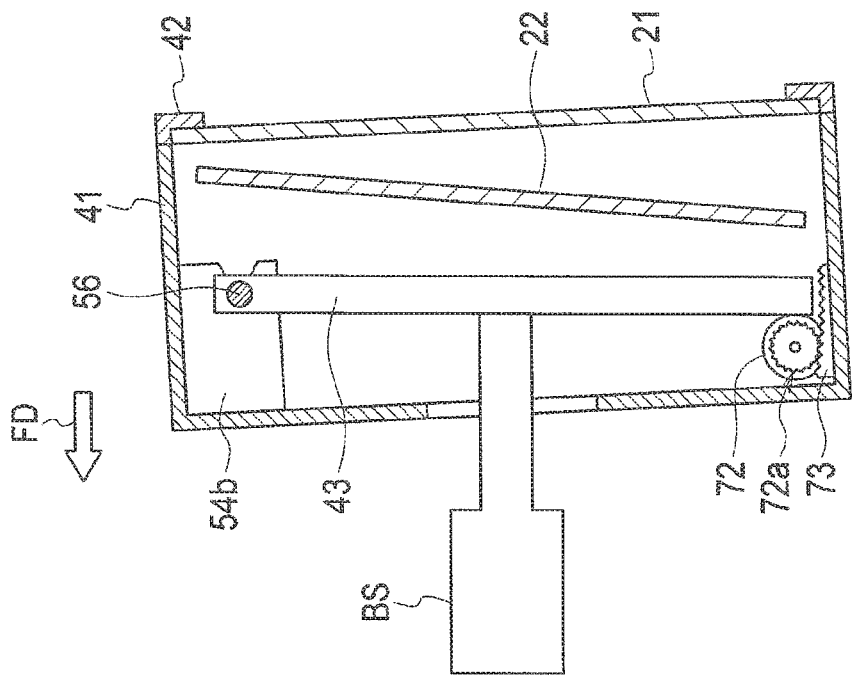
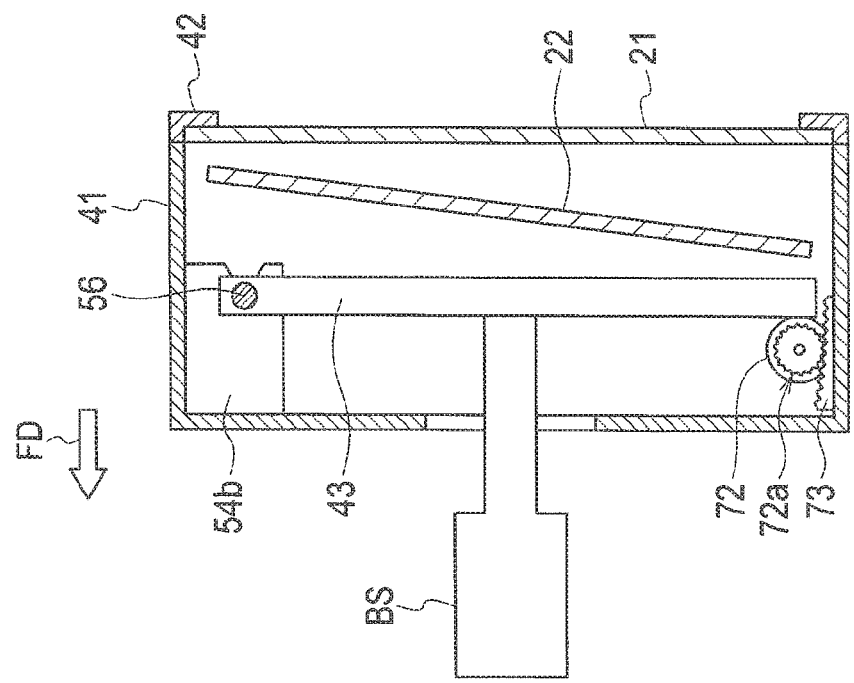

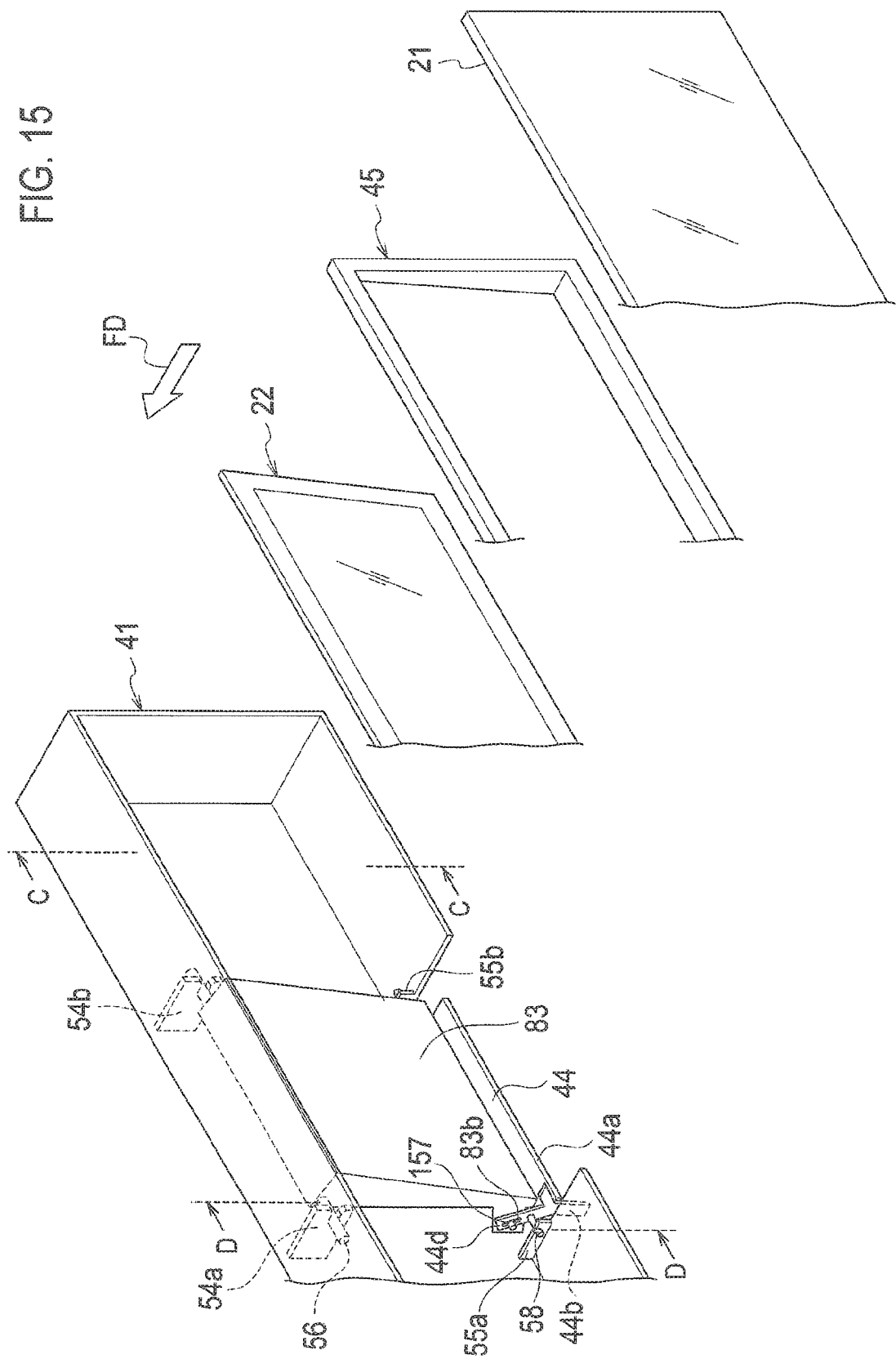

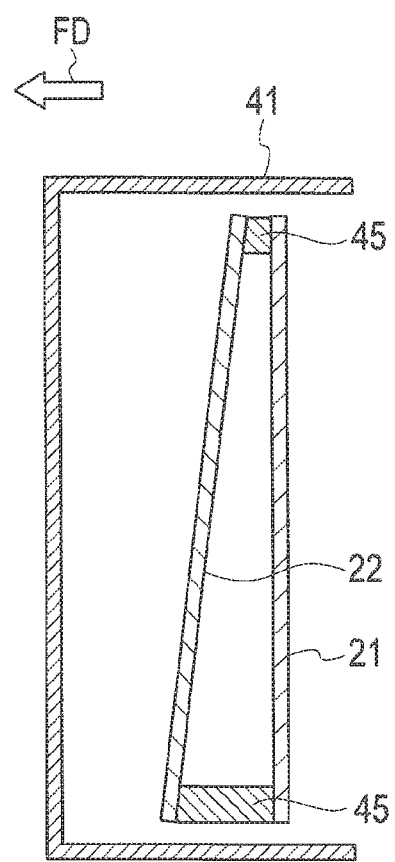

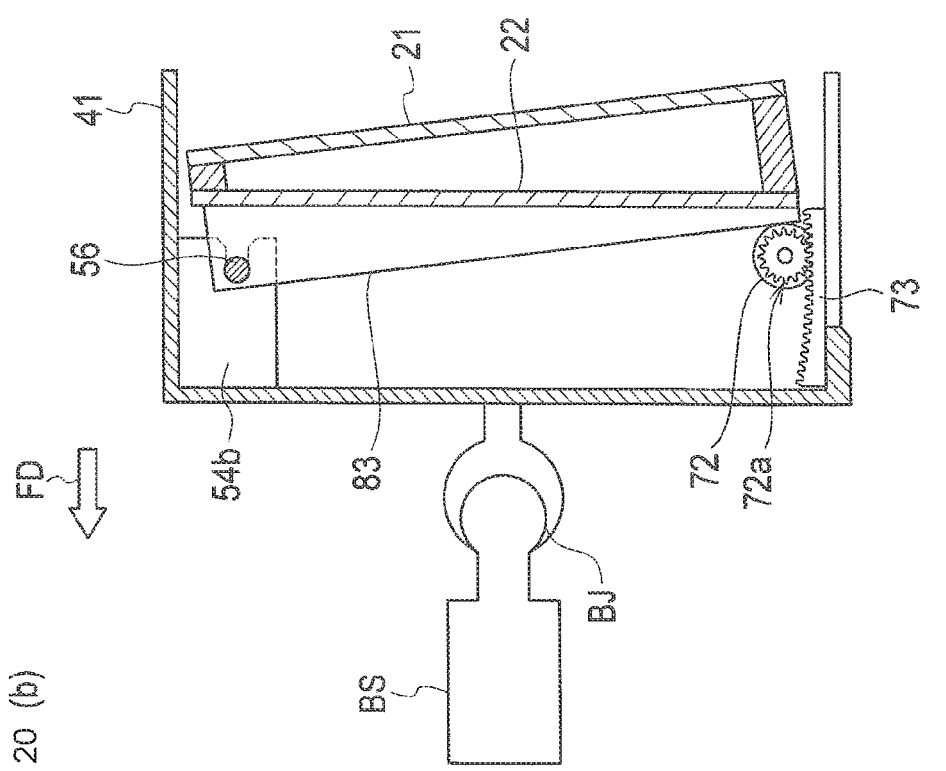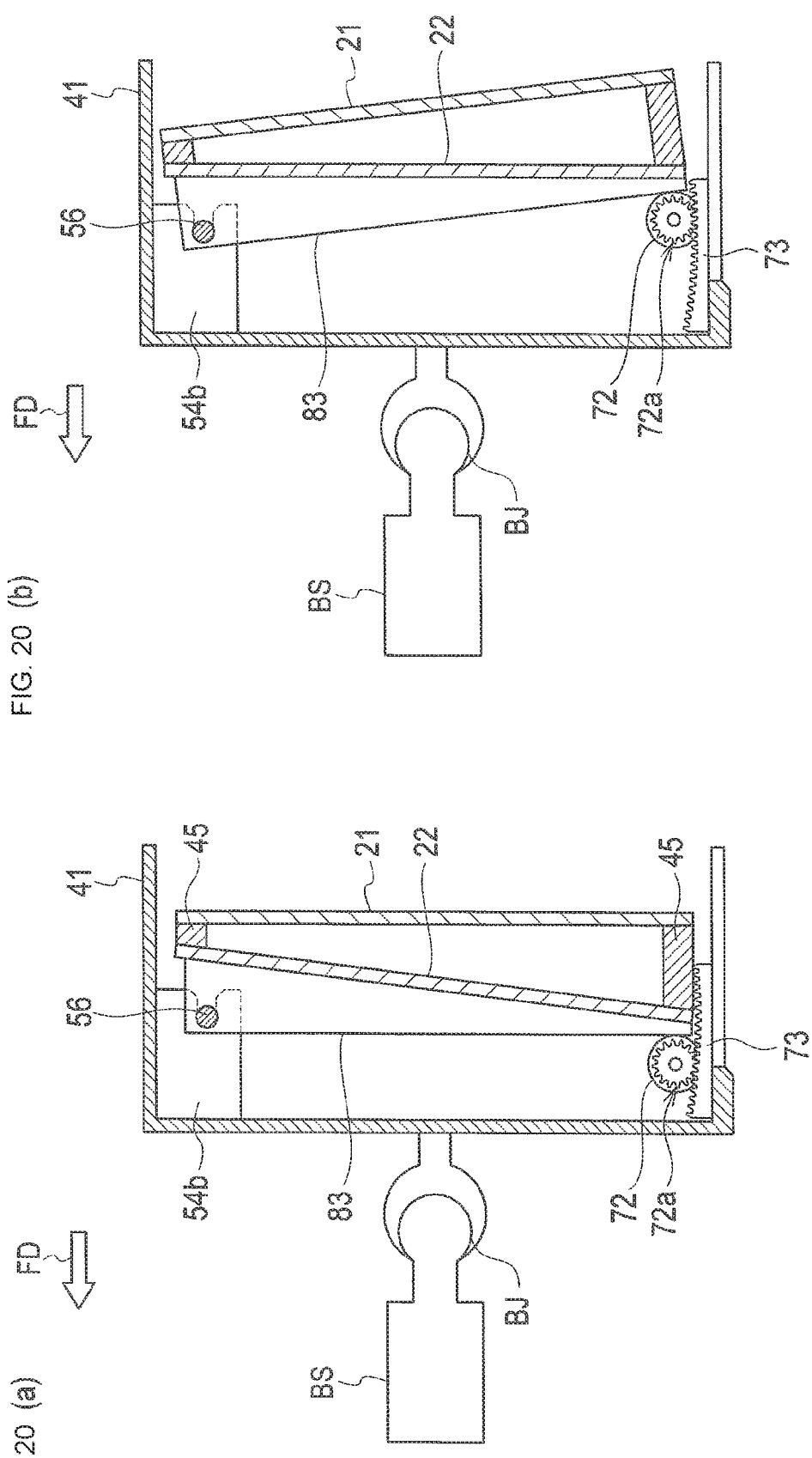

VIDEO DISPLAY MIRROR AND VIDEO DISPLAY MIRROR SYSTEM

FIELD OF INVENTION

The present invention relates to a video display mirror for looking toward the rear of a vehicle and to a video display mirror system.

BACKGROUND ART

A technology for displaying a video by combining a monitor with a rearview mirror for an automobile has been known (see Patent Literature 1 or 2).

In an image recording rearview mirror during traveling described in Patent Literature 1, a mirror surface is installed on a front surface of an auxiliary rearview mirror, and a liquid crystal screen is installed in a hidden mode so as not to influence a rearview mirror function the mirror surface on one end of the mirror surface. On a surface opposite to the auxiliary rearview mirror, a camera can be fixed for photographing an image on the front during traveling by arbitrarily adjusting an angle. The image during traveling photographed by this camera is replayed on the liquid crystal screen.

In Patent Literature 2, one reflective lens capable of light transmission is provided inside a housing of a rearview mirror for an automobile, one liquid crystal display screen is bonded to a rear edge of this reflective lens, and one micro infrared wide-angle video camera is provided at an appropriate position on a peripheral edge of the housing. When an operation of the automobile is normalized, the liquid crystal display screen is brought into a non-display state, and no light is emitted on a rear surface of the reflective lens so that the reflective lens reflects a rear image like a traditional rearview mirror. If a video image photographed by the video camera is displayed on the liquid crystal display screen, light of the video image penetrates the reflective lens capable of light transmission, and a real video image on the rear is displayed on the reflective lens and offered for direct view by a driver.

CITATION LIST

Patent Literature

Patent Literature 1: Japanese Utility Model Registration No. 3140339
Patent Literature 2: Japanese Utility Model Registration No. 3161007

SUMMARY OF INVENTION

If a video image is displayed on a monitor in a state in which an amount of light from the rear of a vehicle reflected by a half mirror toward a passenger of the vehicle is large, an image displayed on the monitor overlaps with a reflective image by the half mirror. As a result, the passenger of the vehicle feels cumbersomeness, and visibility of the video image displayed on the monitor deteriorates.

One or more embodiments of the present invention provides a video display mirror which decreases cumbersomeness the passenger of the vehicle feels due to the light reflected by the half mirror and improves visibility of the video image displayed on the monitor and a video display mirror system.

A video display mirror according to a first aspect of the present invention is provided with a half mirror, a monitor, and an interlocking mechanism. The half mirror is used so that a passenger of the vehicle can look toward the rear of the vehicle. The monitor is installed at a position on the front of the vehicle close to the half mirror. The interlocking mechanism interlocks with display of the video image on the monitor and changes an angle of a reflective surface of the half mirror from the position of the half mirror when the rear of the vehicle is viewed.

The video display mirror system according to a second aspect of the present invention is provided with a camera, a half mirror, a monitor, and an interlocking mechanism. The camera is mounted on the vehicle and photographs an image around the vehicle. The half mirror is used so that the passenger of the vehicle looks toward the rear of the vehicle. The monitor is installed at a position on the front of the vehicle close to the half mirror and displays at least the video image imaged by the camera. The interlocking mechanism interlocks with display of the video image on the monitor and changes an angle of a reflective surface of the half mirror from the position of the half mirror when the rear of the vehicle is viewed.

BRIEF DESCRIPTION OF DRAWINGS

FIGS. 5(a) and 5(b) are sectional views along a B-B cross section in FIG. 3 and diagrams for explaining a motion of the inside mirror 11 by an operation of a lever switch 44 and on/off control of a contact switch 23a. FIG. 5(a) illustrates a position of the inside mirror 11 when a rear view reflected by a half mirror 21 is looked at, and FIG. 5(b) illustrates a position of the inside mirror 11 when a video image is displayed on a monitor 22.

FIGS. 12(a) and 12(b) are diagrams for explaining a motion of an inside mirror 71 by driving of a motor 72. FIG. 12(a) illustrates a position of the inside mirror 71 when the rear view reflected by the half mirror 21 is looked at, and FIG. 12(b) illustrates the position of the inside mirror 71 when a video image is displayed on the monitor 22.

FIG. 15 is a perspective view illustrating a specific configuration example of the inside mirror 11 according to a third embodiment.

FIG. 16 is a sectional view along a C-C cross section in FIG. 15.

FIGS. 17(a) and 17(b) are sectional views along a D-D cross section in FIG. 15 and diagrams for explaining a motion of the inside mirror by the operation of the lever switch 44 and on/off control of the contact switch 23a. FIG. 17(a) illustrates a position of the inside mirror when the rear view reflected by the half mirror 21 is looked at, and FIG. 17(b) illustrates the position of the inside mirror when the video image is displayed on the monitor 22.

FIGS. 20(a) and 20(b) are diagrams for explaining a motion of the inside mirror by driving of the motor 72. FIG. 20(a) illustrates the position of the inside mirror when the rear view reflected by the half mirror 21 is looked at, and FIG. 20(b) illustrates the position of the inside mirror when the video image is displayed on the monitor 22.

DETAILED DESCRIPTION

Figure 1:
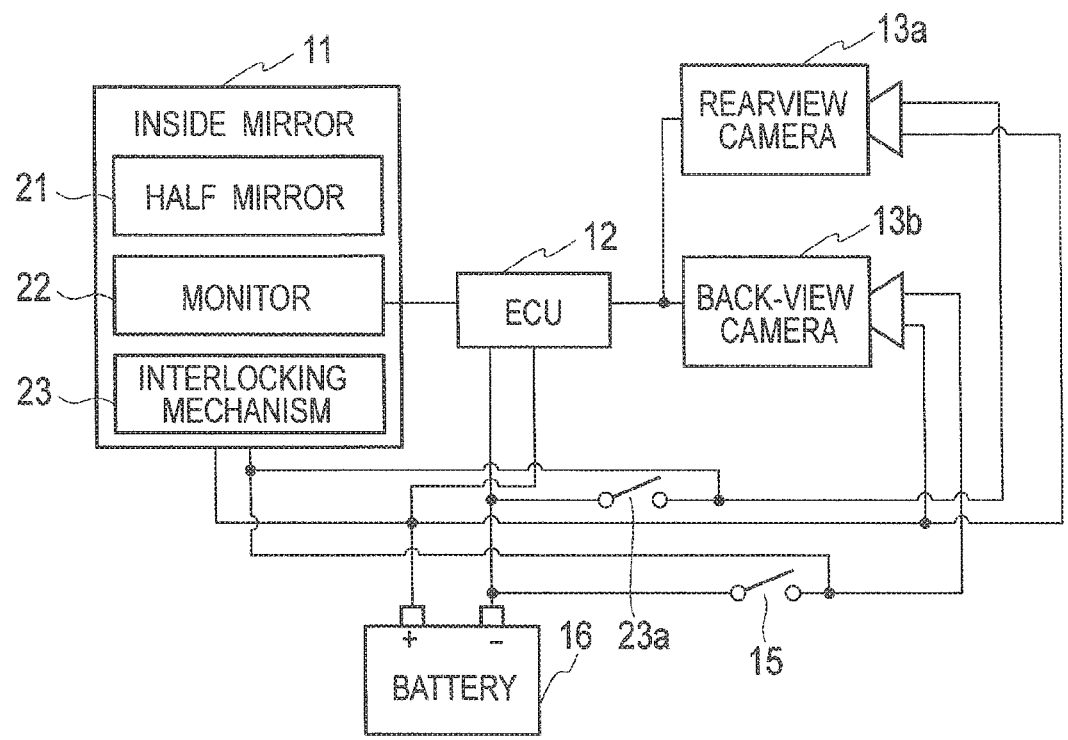
FIG. 1 is a block diagram illustrating a configuration of a video display mirror and a video display mirror system according to a first embodiment of the present invention.

Embodiments of the present invention will be described below by referring to the attached drawings. In descriptions of the drawings, the same reference numerals are given to the same portions, and explanation will be omitted. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

By referring to FIG. 1, configurations of a video display mirror d a video display mirror system according to a first embodiment of the present invention will be described. The video display mirror system has an inside mirror 11 provided inside a cabin, an ECU (engine control unit) 12 having a role as a video controller, cameras (13a, 13b) mounted on a vehicle and photographing a video image around the vehicle, and a battery 16 for supplying DC power to the inside mirror 11, the ECU 12, and the cameras (13a, 13b). In the embodiment, as the camera for photographing a video image around the vehicle, a rearview camera 13a for photographing a rearview for checking a following vehicle and a back-view camera 13b for imaging a back view for detecting an obstacle when the vehicle retreats will be described as an example.

To each of the inside mirror 11, the ECU 12, the rearview camera 13a, and the back-view camera 13b, wiring for supplying DC power from the battery 16 is connected. On the wiring connected to the inside mirror 11 and the rearview camera 13a, a contact switch 23a is provided. On the wiring connected to the back-view camera 13b a reverse position switch 15 is provided. The reverse position switch 15 is a switch closed if a transmission mounted on the vehicle is at a reverse position and opened in the case other than the reverse position.

The inside mirror 11 includes a half mirror 21 used so that a vehicle passenger can look toward the rear of the vehicle, a monitor 22 for displaying a video image imaged by at least either one of the rearview camera 13a and the back-view camera 13b, and an interlocking mechanism 23 for interlocking with display of the video image on the monitor 22 and changing an angle of a reflective surface of the half mirror 21 from a position of the half mirror 21 when the rear of the vehicle is looked at.

By closing of the contact switch 23a, the rearview camera 13a is started, and photographing is started. By closing of the reverse position switch 15, the back-view camera 13b is started, and photographing is started. The rearview camera 13a and the back-view camera 13b transmit photographed video data as a video signal to the ECU 12. In the first embodiment, the ECU 12 does not transmit 1 signal for controlling start of the cameras, that is, the rearview camera 13a and the back-view camera 13b.

The ECU 12 transfers a rearview video signal transferred from the rearview camera 13a to the inside mirror 11 and transfers a back-view video signal transferred from the back-view camera 13b to the inside mirror 11. If the rearview video signal and the back-view video signal are transmitted from the rearview camera 13a and the hack-view camera 13b to the ECU 12 at the same time, the ECU 12 preferentially transfers the back-view video signal to the inside mirror 11. The ECU 12 does not have to transfer the rearview video signal when transferring the back-view video signal.

The inside mirror 11 displays a video image based on a video signal transferred from the ECU 12 on the monitor 22. The inside mirror 11 can preferentially display the back view if the rearview video signal and the back-view video signal are transmitted at the same time. As a result, the ECU 12 can switch the type of video image to be displayed on the monitor 22 depending on whether or not the transmission mounted on the vehicle is at the reverse position. Moreover, the ECU 12 can display on the monitor 22 the back view for detecting an obstacle when the vehicle retreats if the transmission mounted on the vehicle is at the reverse position and can display on the monitor 22 the rearview for checking the following vehicle if the transmission mounted on the vehicle is not at the reverse position. It is needless to say that the type of the video image can be switched by the operation of the passenger or the rearview and the back view can be displayed on the monitor 22 at the same time by dividing the display screen of the monitor 22 into two parts or more.

By referring to FIG. 2, a mounting example of the video display mirror system in FIG. 1 on the vehicle will be described. As a camera for photographing the periphery of a vehicle 25, the rearview camera 13a for photographing a rearview RV for checking the following vehicle and a back-view camera 13b for photographing a back view BV for detecting an obstacle when the vehicle 25 retreats are mounted. In the cabin, the inside mirror 11 for a passenger 26a or a passenger 26b of the vehicle 25 to check a rear view of the vehicle 25 is provided. An arrow FD in FIG. 2 indicates a traveling direction of the vehicle 25. As a camera for photographing the periphery of the vehicle 25, other than the cameras 13a and 13b, a front camera or a side camera for photographing a blind spot ran the front or side of the vehicle can be used, for example.

Figure 3:
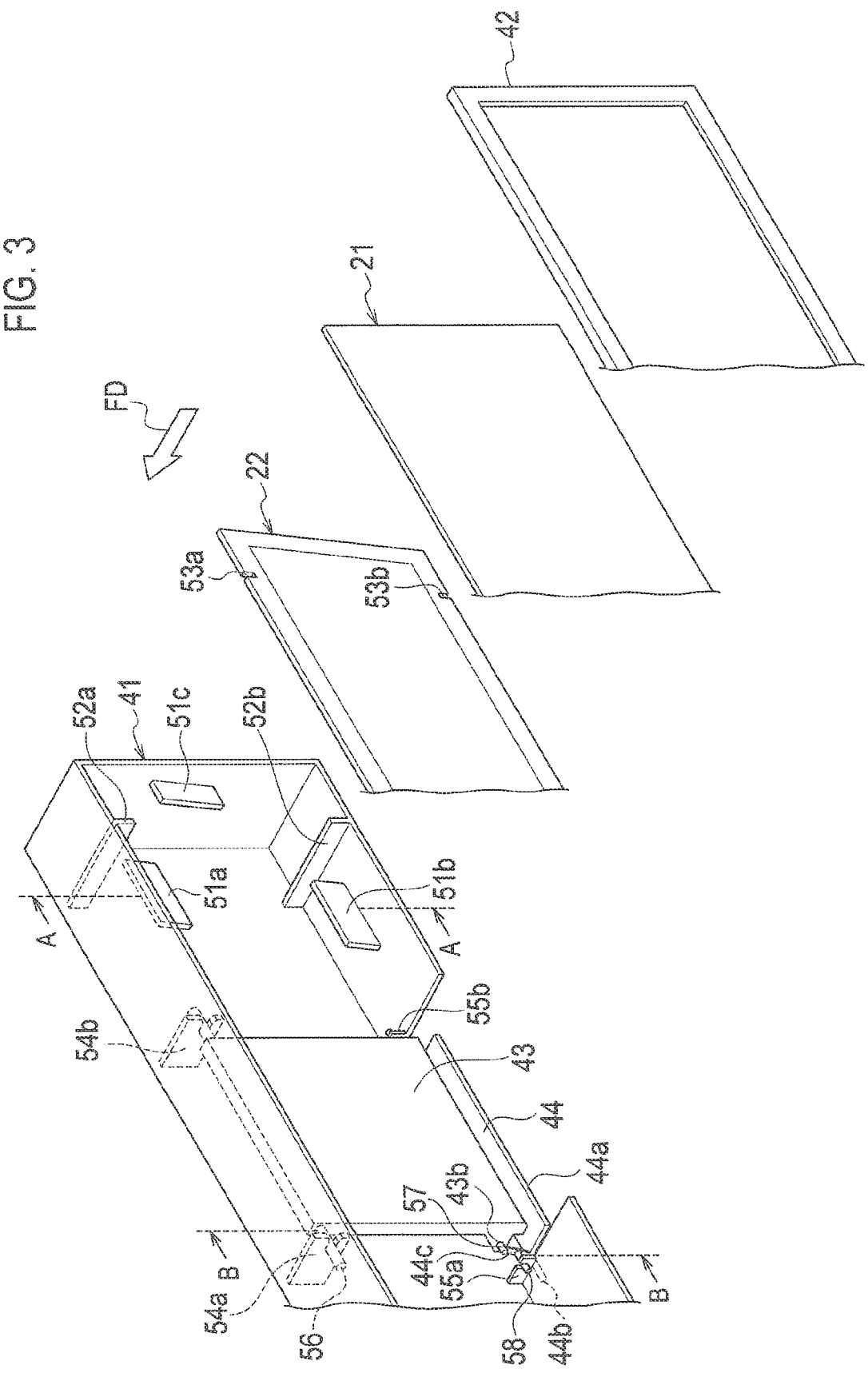
FIG. 3 is a perspective view illustrating a specific configuration example of an inside mirror 11 according to the first embodiment.

By referring to FIG. 3, a specific configuration example of the inside mirror 11 will be described. In FIG. 3, for ease of explanation, major constituent elements of the inside mirror 11 are shown in a separated state, but the inside mirror 11 is assembled by stacking the major constituent elements in the direction indicated by the arrow FD.

The inside mirror 11 is provided with the half mirror 21 for reflecting a part of incident light and transmitting a part thereof, the monitor 22 arranged at the position on the vehicle front FD close to the half mirror 21, the housing 41 for accommodating the half mirror 21 and the monitor 22, and a frame-shaped lid 42 welded to the housing 41.

Inside the housing 41, monitor abutting ribs 51a, 51b, and 51c against which a back surface (a surface directed to the traveling direction FD) of the monitor 22 abuts and mirror abutting ribs 52a and 52b against which a back surface (a surface directed to the traveling direction FD) of the half mirror 21 abuts are provided. At a center part in the housing 41, a bracket 43 and a lever switch 44 for changing an angle of the inside mirror 11 are provided. FIG. 3 illustrates only the abutting ribs 51a, 51b, 51c, 52a and 52b arranged on one side in a vehicle width direction from the bracket 43, but the abutting ribs 51a, 51b, 51c, 52a, and 52b are similarly arranged on the other side in the vehicle width direction from the bracket 43.

On an outer peripheral portion of the monitor 22, notch portions 53a and 53b are formed at positions corresponding to the mirror abutting ribs 52a and 52b, respectively. The notch portions 53a and 53b penetrate the mirror abutting ribs 52a and 52b, the back surface of the monitor 22 abuts against the monitor abutting ribs 51a, 51b, and 51c, and the back surface of the monitor 22 and the monitor abutting ribs 51a, 51b, and 51c are bonded by using an adhesive or a double-sided tape. As a result, the monitor 22 is fixed at a determined angle with respect to the housing 41, determined by the monitor abutting ribs 51a, 51b, and 51c.

The back surface of the half mirror 21 abuts tip ends of the mirror abutting ribs 52a and 52b, and a front surface (a surface on the side opposite to the traveling direction FD) of the half mirror 21 is brought into contact with the lid 42. The half mirror 21 is sandwiched between the mirror abutting ribs 52a and 52b and the lid 42, and by welding of the lid 42 to the housing 41, the half mirror 21 is fixed at a predetermined angle with respect to the housing 41, different from the monitor 22.

The bracket 43 has a plate shape in which a normal line of its front/back surface is directed to the traveling direction FD, and a pair of rotating shafts 56 protrude in the vehicle width direction from both side surfaces of an upper part of the bracket 43. Inside the housing 41, rotation guide portions 54a and 54b are formed. The pair of rotating shafts 56 are supported rotatably with respect to the housing 41 by the rotation guide portions 54a and 54b, respectively. On a lower part of the bracket 43, a bearing 43b for rotatably supporting a rotating shaft 57 of the lever switch 44 which will be described later is forted.

The lever switch 44 has a lever portion 44b offered for an operation of the passenger 26a, the contact extending material portion 44a forming the contact switch 23a in FIG. 1, and a rotating shaft extending material portion 44c forming the rotating shaft 57 of the above described lever switch 44. At a tip end of the rotating shaft extending material portion 44c, the rotating shaft 57 with respect to the bracket 43 is formed. The rotating shaft 57 is supported rotatably by the bearing 43b of the bracket 43. From both side surfaces of the rotating shaft extending material portion 44c, the pair of rotating shafts 58 with respect to the housing 41 protrude in the vehicle width direction. In the housing 41, the rotation guide portions 55a and 55b are formed. The pair of rotating shafts 58 are supported rotatably with respect to the housing 41 by the rotation guide portions 55a and 55b, respectively. Bearings of the rotation guide portions 55a and 55b are formed larger than the pair of rotating shafts 58 so that the pair of rotating shafts 58 can move in parallel in the bearings of the rotation guide portions 55a and 55b.

Figure 4:
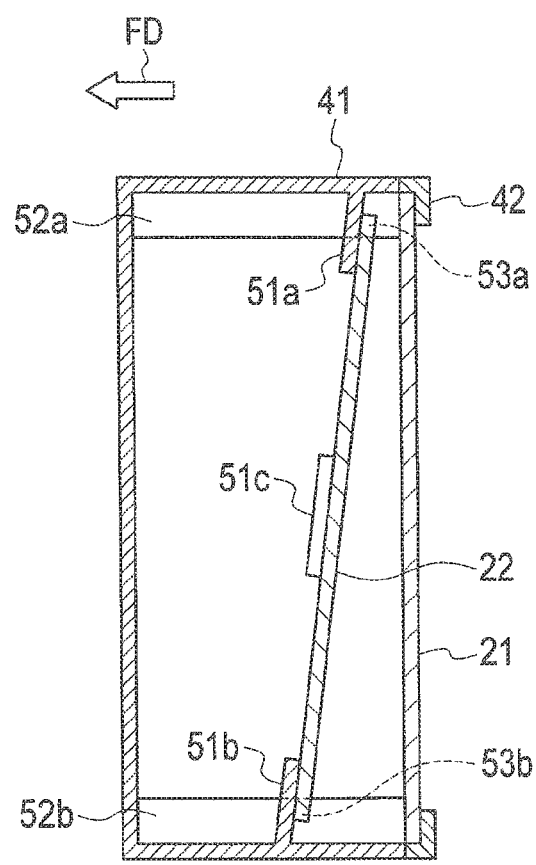
FIG. 4 is a sectional view along an A-A cross section in FIG. 3.

As illustrated in FIG. 4, on an A-A cross section in FIG. 3, the notch portions 53a and 53b of the monitor 22 penetrate the mirror abutting ribs 52a and 52b, and the back surface of the monitor 22 is brought into contact with the monitor abutting ribs 51a, 51b, and 51c. The half mirror 21 is sandwiched between tip ends of the mirror abutting ribs 52a and 52b and the lid 42, and by welding of the lid 42 to the housing 41, the half mirror 21 is fixed to the housing 41. As illustrated in FIG. 4, the monitor 22 is installed at a position on the vehicle front close to the half mirror 21. The half mirror 21 and the monitor 22 are fixed at different predetermined angles with respect to the housing 41. That is, the half mirror 21 and the monitor 22 are arranged with inclination. Specifically, a reflective surface (front surface) of the half mirror 21 is inclined more upward than a display surface (back surface) of the monitor 22.

Figure 5:
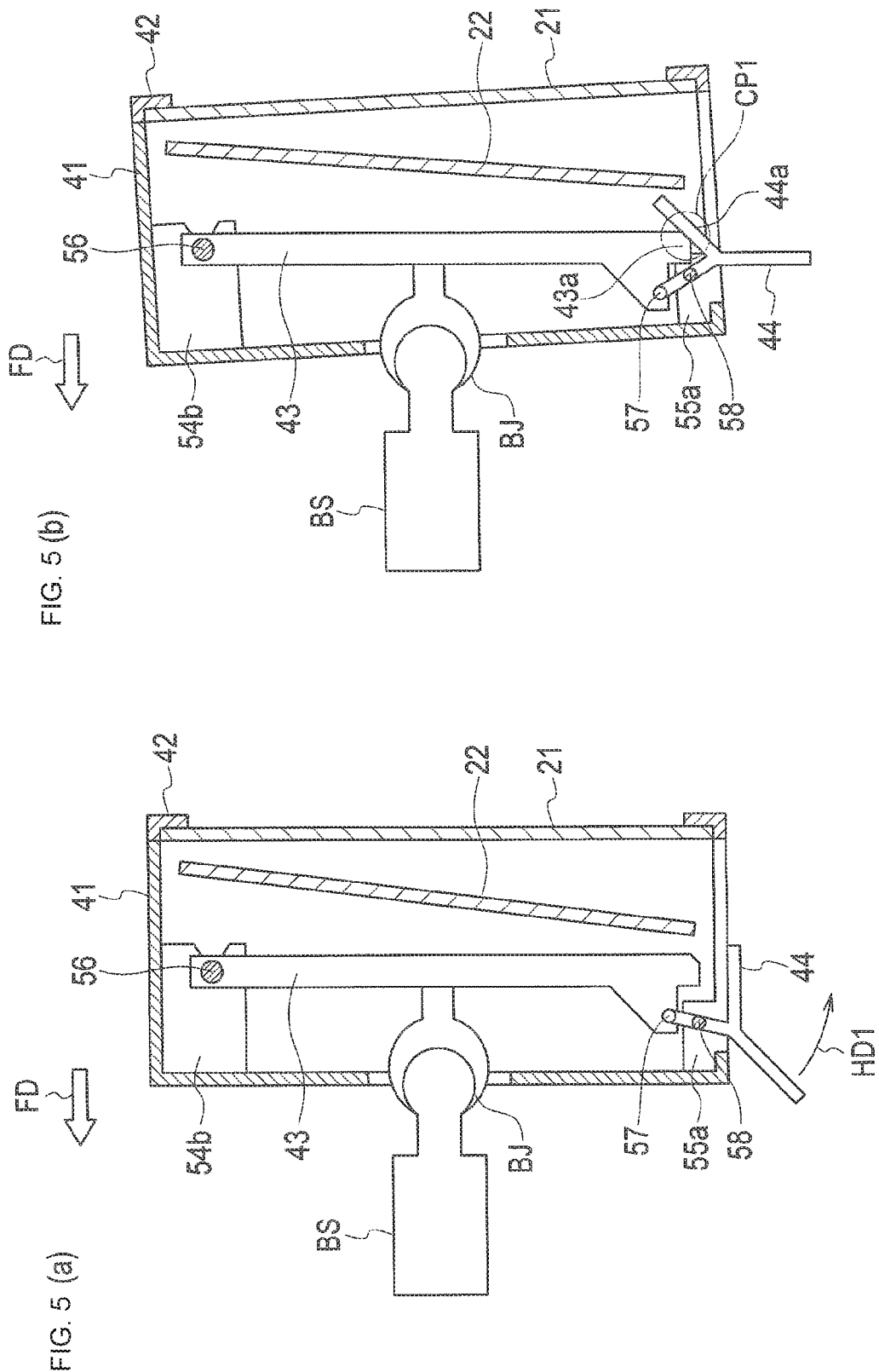

By referring to FIG. 5(a) and FIG. 5(b), a motion of the inside mirror 11 and on/off control of the contact switch by an operation of the lever switch 44 will be described. FIG. 5(a) and FIG. 5(b) are sectional views along a B-B cross section in FIG. 3. The bracket 43 is connected to a vehicle joint portion BS through a ball joint BJ. The vehicle joint portion BS is fixed to the vicinity of a center on an upper part of a front window of the vehicle 25, for example.

FIG. 5(a) illustrates a position of the inside mirror 11 when the passenger 26a looks toward the rear view reflected by the half mirror 21. In a state illustrated in FIG. 5(a), the rear view of the vehicle 25 with respect to the passenger 26a of the vehicle 25 is projected to the half mirror 21 and the video image is not displayed on the monitor 22. Thus, since the inside of the inside mirror 11 is dark, and the outside is in a bright state, the passenger 26a of the vehicle 25 can easily check the rear of the vehicle by the half mirror 21.

The passenger 26a of the vehicle 25 operates the lever switch 44 in FIG. 5(a) to a direction HD1 opposite to the vehicle traveling direction FD. Then, the lever switch 44 rotates with respect to the housing 41 around the pair of rotating shafts 58. At the same time with that, the lever switch 44 also rotates with respect to the bracket 43 around the rotating shaft 57, and the bracket 43 rotates with respect to the housing 41 around a rotating shaft 56. As indicated by a reference character CP1 in FIG. 5(b), if a contact extending material portion 44a of the lever switch 44 is brought into contact with a lower end portion 43a of the bracket 43, whereby each rotation operation described above is stopped, and at the same time the contact switch 23a formed on the lower end portion 43a of the bracket 43 is closed. By closing of the contact switch 23a, a video image is displayed on the monitor 22.

FIG. 5(b) shows a state in which the aforementioned rotation operation is stopped and also illustrates a position of the inside mirror 11 when the video image is displayed on the monitor 22. Before and after the rotation operation, angles of the housing 41, the half mirror 21, and the monitor 22 are changed upward similarly. On the other hand, the bracket 43, the ball joint BJ, and the vehicle joint portion BS do not move before and after the rotation operation.

As described above, the interlocking mechanism 23 provided in the inside mirror 11 is a manual interlocking mechanism including the contact switch 23a switched to on/off in accordance with the angle of the half mirror 21 and the lever switch 44 for performing on/off control of the contact switch 23a by changing the angle of the inside mirror 11. As a result, the interlocking mechanism 23 can change the angle of the reflective surface of the half mirror 21 from the position of the half mirror 21 when the rear of the vehicle is looked at by interlocking with display of a video image on the monitor 22. If the passenger 26a pulls forward the lever switch 44 in FIG. 5(a), the housing 41, the half mirror 21, and the monitor 22 incline upward by a hinge structure. Moreover, by closing of the contact switch 23a, the cameras 13a and 13b and the monitor 22 are started, and a video image is displayed on the monitor 22. At this time, the half mirror 21 is directed upward so as to prevent a double image by eliminating reflection.

Figure 6:
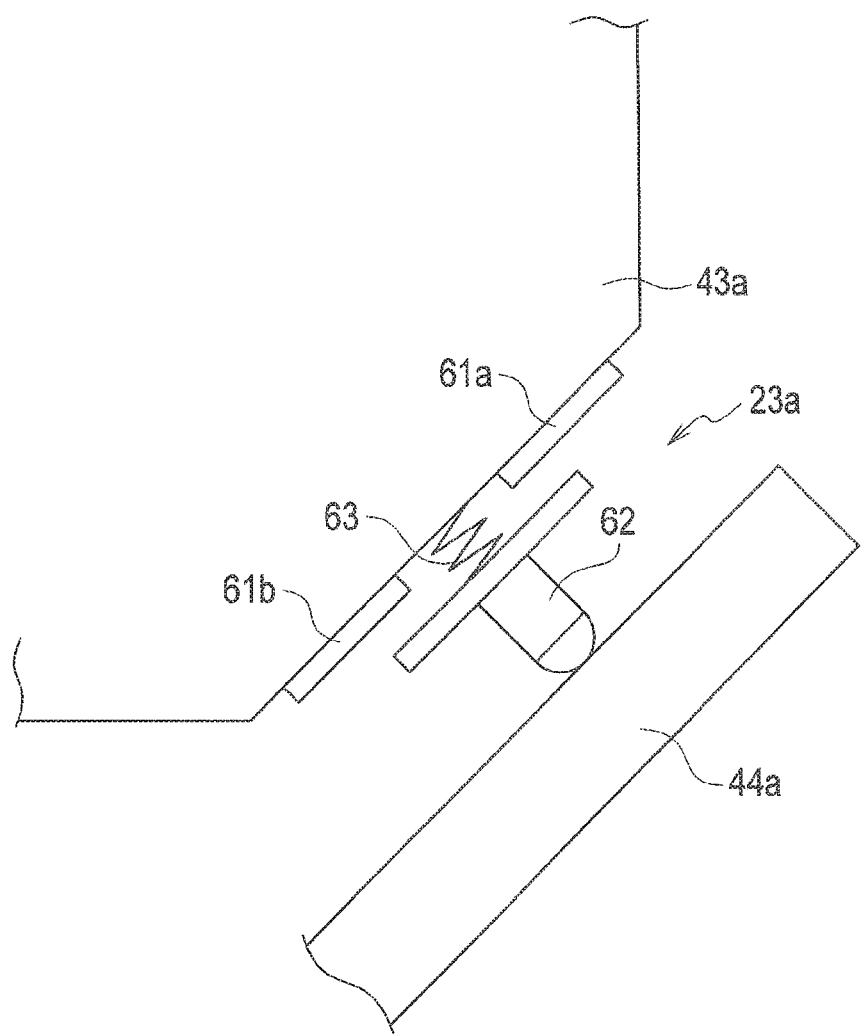
FIG. 6 is a sectional view illustrating configurations of a contact extending material portion 44a of the lever switch 44 and the contact switch 23a formed on a lower end portion 43a of a bracket 43.

By referring to FIG. 6, a configuration of the contact switch 23a formed on the lower end portion 43a of the bracket 43 will be described. The contact switch 23a includes two fixed contacts 61a and 61b arranged separately and a movable contact 62 supported by the lower end portion 43a of the bracket 43 through a spring 63. In the state of FIG. 5(a), since the contact extending material portion 44a of the lever switch 44 is located away from the lower end portion 43a of the bracket 43, the movable contact 62 does not contact the fixed contacts 61a and 61b and the contact switch 23a is in an off state. In the state of FIG. 5(b), since the contact extending material portion 44a of the lever switch 44 is brought into contact with the lower end portion 43a of the bracket 43, the lower end portion 43a of the bracket 43 presses the movable contact 62, and the movable contact 62 is brought into contact with the fixed contacts 61a and 61b. Thus, the contact switch 23a is brought into an on state.

Figure 7A:
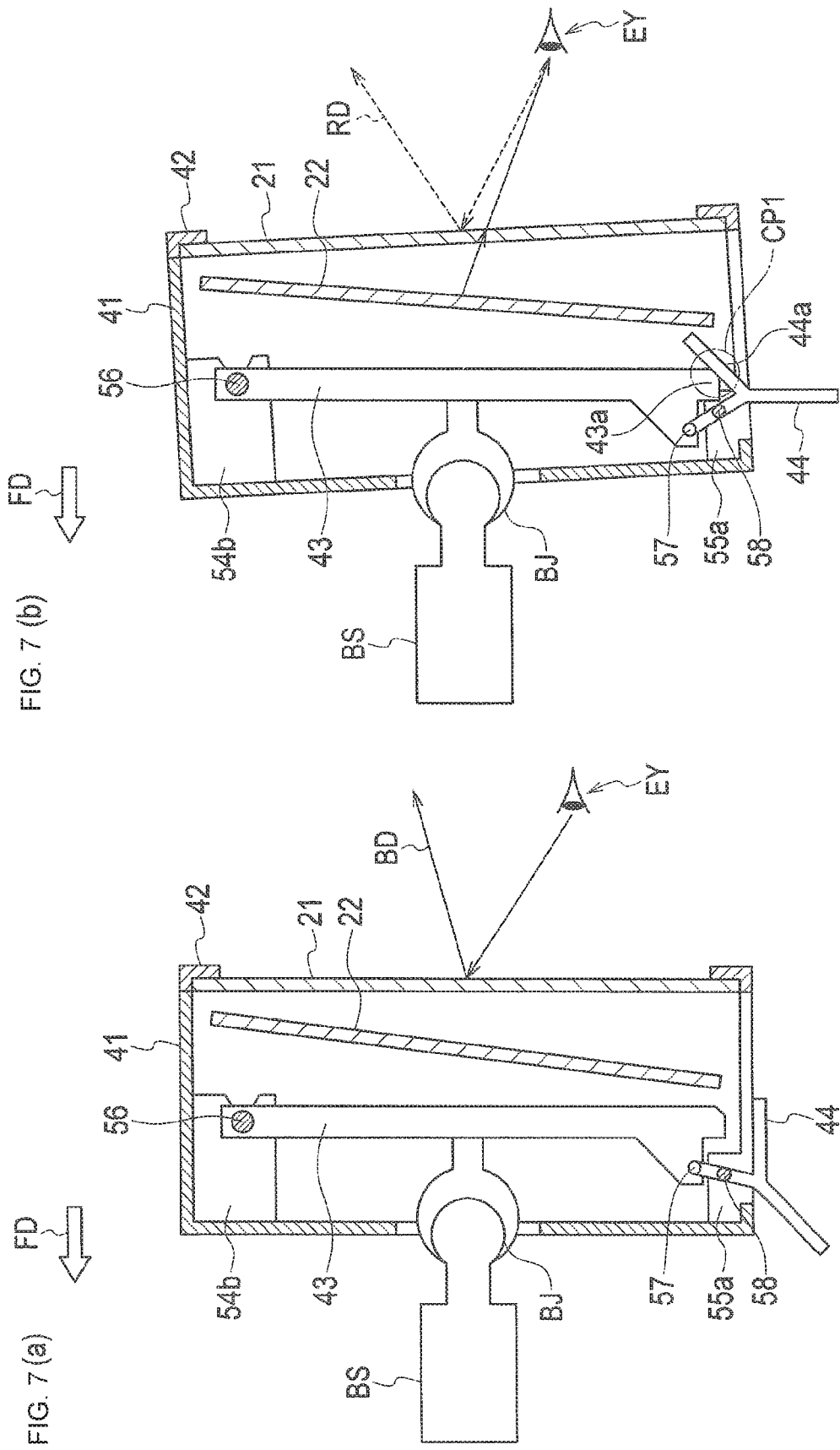
FIG. 7(a) and FIG. 7(b) are diagrams corresponding to FIG. 5(a) and FIG. 5(b), respectively, for explaining an effect by the first embodiment of the present invention.

As illustrated in FIG. 7(a), in the state of FIG. 5(a), since an eye line extended from an eye EY of the passenger 26a is directed to the rear view BD, the rear view of the vehicle 25 is projected to the half mirror 21 with respect to the passenger 26a of the vehicle 25, and an amount of light reflected by the half mirror 21 toward the passenger 26a of the vehicle 25 becomes large in this state. In the state of FIG. 5(a), since the contact switch 23a is open, no video image is displayed on the monitor 22, and the monitor 22 looks dark. Thus, since the inside of the inside mirror 11 is dark and the outside is bright, the passenger 26a of the vehicle 25 can easily check the rear view by the half mirror 21.

Figure 7B:
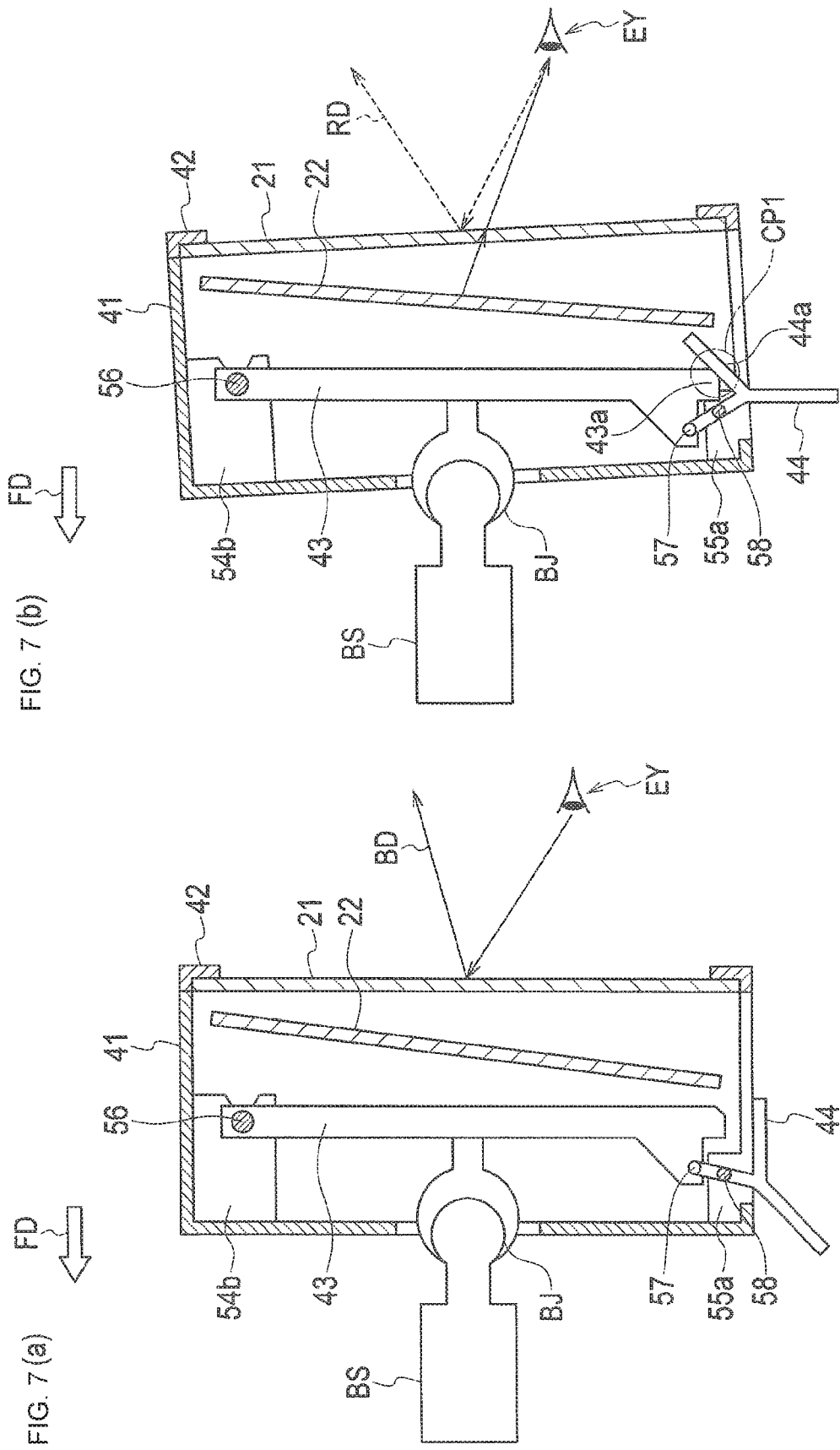

On the other hand, as illustrated in FIG. 7(b), in the state of FIG. 5(b), since the housing 41, the half mirror 21, and the monitor 22 are directed upward, the eye line extended from the eye EY of the passenger 26a is directed to a roof direction RD in the cabin. Thus, the light amount reflected by the half mirror 21 toward the passenger 26a of the vehicle 25 decreases as compared with the state of FIG. 5(a). In the state of FIG. 5(b), since the contact switch 23a is closed, a video image is displayed on the monitor 22. Thus, since a state in which the inside of the inside mirror 11 is bright and the outside is dark is formed, the passenger 26a of the vehicle 25 no longer feels cumbersomeness by the light reflected by the half mirror 21, and visibility of the video image displayed on the monitor 22 is improved. As a result, a light amount of the monitor 22 can be kept lower than an existing technology.

Figure 8:
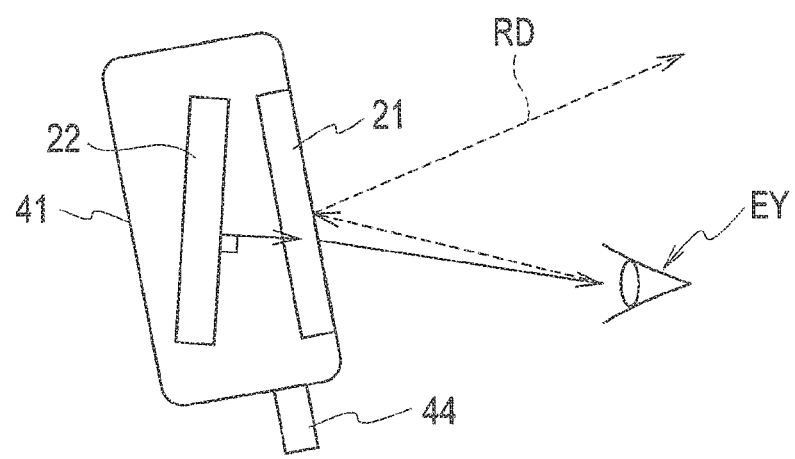
FIG. 8 is a diagram corresponding to FIG. 5(b) for explaining an effect by the embodiment of the present invention.

As illustrated in FIG. 8, in the state of FIG. 5(b), interlocking with display of a video image on the monitor 22, the display surface of the monitor 22 can be directed to the passenger 26a of the vehicle 25. As a result, visibility of the video image displayed on the monitor 22 can be further improved. For example, it is only necessary to direct the display surface of the monitor 22 perpendicularly to the passenger 26a of the vehicle 25. Since an angle of the display surface of the monitor 22 which improves visibility of the video image is different depending on characteristics of the monitor 22, directing perpendicularly is not limiting, and the display surface may be directed to an angle at which the visibility of the video image is improved.

Moreover, the half mirror 21 and the monitor 22 can be fixed with respect to each other in a state in which the display surface of the monitor 22 is directed toward the passenger 26a of the vehicle 25, and the reflective surface of the half mirror 21 is directed to an upper direction (the roof direction RD, for example) than an angle when the rear of the vehicle is looked at. The interlocking mechanism 23 can direct the reflective surface of the half mirror 21 to the upper direction than the angle when the rear of the vehicle is looked at and at the same time, can direct the display surface of the monitor 22 toward the passenger of the vehicle by changing the angles of the reflective surface of the half mirror 21 and the display surface of the monitor 22 at the same time. Thus, angle control of the half mirror 21 and the monitor 22 by the interlocking mechanism 23 is made easy.

Alternatively, the half mirror 21 and the monitor 22 can be fixed to each other in a state in which the display surface of the monitor 22 is directed to the passenger 26a of the vehicle 25, and the reflective surface of the half mirror 21 is directed to a lower direction (a floor direction, for example) than the angle when the rear of the vehicle is looked at. In this case, the interlocking mechanism 23 can direct the reflective surface of the half mirror 21 to the lower direction than the angle when the rear of the vehicle is looked at and at the same time, can direct the display surface of the monitor 22 toward the passenger of the vehicle by changing the angles of the reflective surface, of the half mirror 21 and the display surface of the monitor 22 to the lower direction at the same time. For example, the state illustrated in FIG. 5(a) and the state illustrated in FIG. 5(b) can be switched in practice.

By referring to FIG. 9, an operation example of the video display mirror system according to the first embodiment will be described. First, if ignition is in the off state (OFF at S01), the inside mirror 11 is used as a normal mirror in the state illustrated in FIG. 5(a) (S05). That is, a video image is not displayed on the monitor 22, and the rear view of the vehicle 25 is reflected by the half mirror 21 to the passenger 26a of the vehicle 25.

If the ignition is in the on state (ON at S01), the process proceeds to S03 step, and if the lever switch 44 is in the state illustrated, in FIG. 5(a), that is, in a state in which the contact switch 23a is open (OFF at S03), the process proceeds to S21 step. Then, if the transmission is at the reverse position (YES at S21), the reverse position switch 15 is closed, and DC power is supplied to the monitor 22 and the back-view camera 13b. The back view BV is displayed on the monitor 22 (S23). Subsequently, if the transmission provided in the vehicle 25 leaves the reverse position (S25), the reverse position switch 15 is opened, supply of the DC power to the monitor 22 and the back-view camera 13b is stopped, and a video image is not displayed on the monitor 22 (S27). Subsequently, the inside mirror 11 is used as the normal mirror (S29).

On the other hand, if the passenger 26a operates the lever switch 44 and brings the inside mirror 11 into the state illustrated in MG. 5(b) (ON at S03), the contact switch 23a is closed, and the DC power is supplied to the monitor 22 and the rearview camera 13a. As a result, the rearview RV is displayed on the monitor 22 (S07). Subsequently, if the transmission comes to the reverse position (YES at S09), the reverse position switch 15 is closed, and the DC power is supplied also to the back-view camera 13b. Then, a rearview video image signal and a back-view video image signal are transmitted from the rearview camera 13a and the back-view camera 13b to the ECU 12 at the same time, and thus, the ECU 12 preferentially transfers the back-view video image signal to the inside mirror 11. Thus, the video image displayed on the monitor 22 is switched from the rearview RV to the back view BV (S11). Subsequently, if the transmission leaves the reverse position (S13), the reverse position switch 15 is opened, and supply of the DC power to the back-view camera 13b is stopped. Thus, the video image displayed on the monitor 22 is switched from the back view BV to the rear view RV (S15). On the other hand, at S09, if the transmission is at a position other than the reverse position (NO at S09), with the inside mirror 11 in the state illustrated in FIG. 5(b), the rearview RV is displayed on the monitor 22. Subsequently, if the passenger 26a operates the lever switch 44 and returns the inside mirror 11 to the state illustrated in FIG. 5(a) (S17), the contact switch 23a is opened, and supply of the DC power to the monitor 22 and the rearview camera 13a is stopped. Subsequently, the inside mirror 11 is used as a normal mirror (S29).

As described above, according to the first embodiment, the following working effects can be obtained.

Interlocking with display of the video image (BV, RV) on the monitor 22, an angle of the reflective surface of the half mirror 21 is changed from the position of the half mirror 21 when the rear of the vehicle is looked at. As a result, the amount of light from the rear of the vehicle reflected by the half mirror 21 toward the passengers 26a and 26b of the vehicle 25 decreases. Thus, cumbersomeness the passengers 26a and 26b of the vehicle 25 feel by the light reflected by the half mirror 21 decreases, and visibility of the video image (BV, RV) displayed on the monitor 22 is improved. Thus, the light amount of the monitor 22 can be kept lower than the existing technology.

The interlocking mechanism 23 interlocks with display of the video image (BV, RV) on the monitor 22 and directs the display surface of the monitor 22 toward the passengers 26a and 26b of the vehicle 25 so that visibility of the video image displayed on the monitor 22 is further improved.

The half mirror 21 and the monitor 22 are fixed to each other in a state in which the display surface of the monitor 22 is directed toward the passengers 26a and 26b of the vehicle 25, and the reflective surface of the half mirror 21 is directed to the upper direction or the lower direction than the angle when the rear of the vehicle is looked at. The interlocking mechanism 23 directs the reflective surface of the half mirror 21 to the upper direction or the lower direction than the angle when the rear of the vehicle is looked at and can direct the display surface of the monitor 22 toward the passengers 26a and 26b of the vehicle 25. Thus, angle control of the half mirror 21 and the monitor 22 by the interlocking mechanism 23 is made easier.

The ECU 12 switches the type of the video image (BV, RV) to be displayed on the monitor 22 depending on whether or not the transmission mounted on the vehicle 25 is at the reverse position. As a result, the optimal video image (BV, RV) can be displayed in accordance with a shift position of the transmission.

The ECU 12 displays the back view BV for detecting an obstacle when the vehicle 25 retreats if the transmission mounted on the vehicle 25 is at the reverse position and displays the rearview RV for checking the following vehicle on the monitor 22 if the transmission mounted on the vehicle 25 is not at the reverse position. As a result, the rear video image in the vicinity of the vehicle can be displayed when the vehicle 25 retreats, while the video image in a wider range on the rear of the vehicle can be displayed in the case other than that.

The interlocking mechanism 23 includes the contact switch 23a switched to on/off in accordance with the angle of the half mirror 21, and controls display and non-display of the video image (BV, RV) in accordance with on/off of the contact switch 23a. As a result, since the interlocking mechanism 23 can be mechanically constituted, reliability of the interlocking mechanism 23 is improved.

When the transmission provided in the vehicle 25 is at the reverse position, regardless of open/closed of the contact switch 23a, the interlocking mechanism 23 interlocks with display of the back view BV on the monitor 22 and can change the angle of the half mirror 21 from the position of the half mirror 21 when the rear of the vehicle is looked at. When the vehicle 25 retreats, visibility of the video image of the rear of the vehicle displayed on the monitor 22 is improved.

The bracket 43 is fixed to the vehicle 25, the half mirror 21 and the monitor 22 are fixed to the housing 41 at different angles, and the interlocking mechanism 23 changes the angles of the housing 41, the half mirror 21, and the monitor 22 with respect to the bracket 43. As a result, the reflective surface of the half mirror 21 can be directed to the upper direction or the lower direction than the angle when the rear of the vehicle is looked at and at the same time, the display surface of the monitor 22 can be directed toward the passengers 26a and 26b of the vehicle 25. Thus, angle control of the half mirror 21 and the monitor 22 by the interlocking mechanism 23 is made easier.

Modified Example

Figure 10:
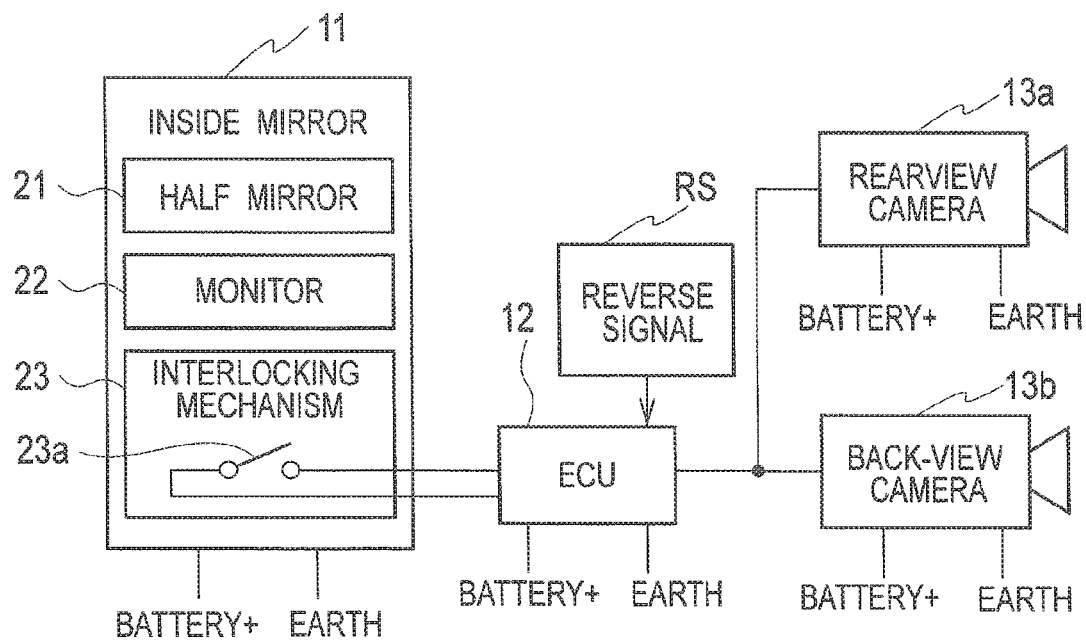
FIG. 10 is a block diagram illustrating a configuration of a video display mirror and a video display mirror system according to a modified example of the first embodiment.

In the configuration example of the video display mirror system according to the first embodiment, the contact switch 23a and the reverse position switch 15 are arranged on the wiring for supplying the DC power from the battery 16. In a modified example of the first embodiment, as illustrated in FIG. 10, both terminals of the contact switch 23a are directly connected to the ECU 12, and a signal indicating a state of the contact switch 23a is transmitted to the ECU 12. Instead of provision of the reverse position switch 15, the ECU 12 receives a reverse signal RS indicating that the transmission is at the reverse position. The ECU 12 transmits a camera control signal to the rearview camera 13a or the back-view camera 13b on the basis of a signal indicating the state of the contact switch 23a and the reverse signal RS and controls the start of the rearview camera 13a or the back-view camera 13b. Moreover, the ECU 12 transmits a monitor control signal to the monitor 22 on the basis of the signal indicating the state of the contact switch 23a and the reverse signal RS and controls the start of the monitor 22.

If the ECU 12 receives a signal indicating a state in which the contact switch 23a is closed and does not receive the reverse signal RS, the ECU 12 starts the rearview camera 13a and the monitor 22 and displays the rearview RV on the monitor 22. If the ECU 12 receives a signal indicating the state in which the contact switch 23a is closed and receives the reverse signal RS, the ECU 12 starts the back-view camera 13b and the monitor 22 and displays the back view BV on the monitor 22. If the ECU 12 receives a signal indicating a state in which the contact switch 23a is open, the ECU 12 does not start the cameras 13a and 13b and the monitor 22 and does not display the video image on the monitor 22.

Second Embodiment

In the second embodiment, instead of the manual interlocking mechanism 23, the video display mirror using an electric interlocking mechanism and the video display mirror system will be described.

Figure 11:
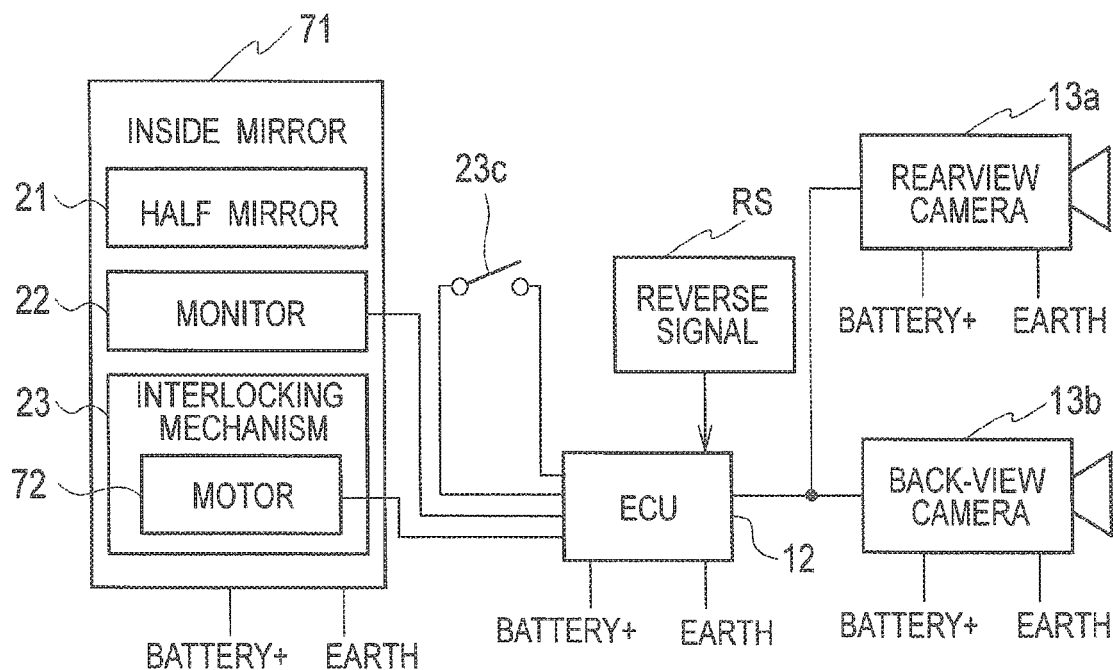
FIG. 11 is a block diagram illustrating a configuration of a video display mirror and a video display mirror system according to a second embodiment of the present invention.

By referring to FIG. 11, configurations of the video display mirror and the video display mirror system according to the second embodiment of the present invention will be described. An inside mirror 71 as an example of the video display mirror includes the electric interlocking mechanism 23. The interlocking mechanism 23 changes the angle of the reflective surface of the half mirror 21 by using a motor 72. Moreover, on an instrument panel of the vehicle 25, a switching switch 23c is provided at a position where the passenger 26a can perform an operation. As illustrated in FIG. 11, both terminals of the switching switch 23c are directly connected to the ECU 12, and the ECU 12 receives a signal indicating a state of the switching switch 23c. The ECU 12 receives the reverse signal RS indicating that the transmission is at the reverse position. The ECU 12 transmits a camera control signal to the rearview camera 13a or the back-view camera 13b on the basis of the signal indicating the state of the switching switch 23c and the reverse signal RS and controls an operation of the rearview camera 13a or the back-view camera 13b. Moreover, the ECU 12 transmits a motor control signal to the motor 72 on the basis of the signal indicating the state of the switching switch 23c and the reverse signal. RS and controls an operation of the motor 72.

If the ECU 12 receives a signal indicating a state in which the switching switch 23c is closed and does not receive the reverse signal RS, the ECU 12 starts the rearview camera 13a and the monitor 22 and displays the rearview RV on the monitor 22. Then, the ECU 12 drives the motor 72 and changes the angle of the reflective surface of the half mirror 21 from the position of the half mirror 21 when the rear of the vehicle is looked at. As a result, interlocking with display of the video image (RV) on the monitor 22, the angle of the reflective surface of the half mirror 21 can be changed from the position of the half mirror 21 when the rear of the vehicle is looked at.

If the ECU 12 receives a signal indicating a state in which the switching switch 23c is closed and receives the reverse signal RS, the ECU 12 starts the back-view camera 13b and the monitor 22 and displays the back view BV on the monitor 22. Then, the ECU 12 drives the motor 72 and changes the angle of the reflective surface of the half mirror from the position of the half mirror 21 when the rear of the vehicle is looked at. As described above, if the ECU 12 receives a signal indicating a state in which the switching switch 23c is closed, the ECU 12 drives the motor 72 and changes the angle of the reflective surface of the half mirror 21 from the position of the half mirror 21 when the rear of the vehicle is looked at. Moreover, the video image displayed on the monitor 22 is switched depending on whether or not the reverse signal RS is received.

If the ECU 12 receives a signal indicating a state in which the switching switch 23c is open, the ECU 12 does not start the cameras 13a and 13b and the monitor 22 and does not display the video image on the monitor 22. The ECU 12 does not drive the motor 72. Thus, the angle of the reflective surface of the half mirror 21 is the same as that when the rear of the vehicle is looked at.

By referring to FIG. 12(a) and FIG. 12(b), a motion of the inside mirror 71 by driving of the motor 72 will be described. FIG. 12(a) and FIG. 12(b) are diagrams corresponding to sectional views along the B-B cross section in FIG. 3. Instead of the lever switch 44, the motor 72 is accommodated inside the housing 41. The bracket 43 is directly connected to the vehicle joint portion BS. The motor 72 is fixed to a lower part on the back surface (surface directed to the traveling direction. FD) of the bracket 43.

Figure 13:
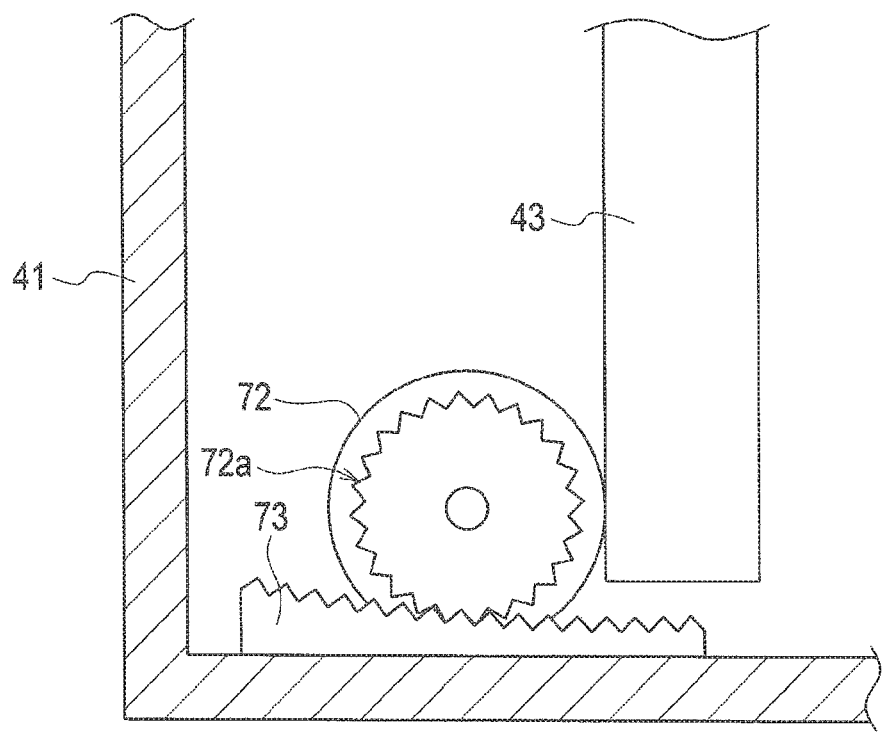
FIG. 13 is a sectional view enlarging a part of the motor 72 in FIG. 12(a).

As illustrated in FIG. 13, the motor 72 is installed so that its rotating shaft is directed toward the horizontal direction, and a gear 72a is provided on the rotating shaft of the motor 72. On a lower end portion of the housing 41, an irregular portion 73 is formed so as to mesh with the gear 72a. The irregular portion 73 is formed into an arc shape around the rotating shaft 56.

FIG. 12(a) illustrates the position of the inside mirror 11 when the passenger 26a looks toward the rear view reflected by the half mirror 21. In a state illustrated in FIG. 12(a), the rear view of the vehicle 25 is projected to the half mirror 21 to the passenger 26a of the vehicle 25, and a video image is not displayed on the monitor 22. Thus, since the inside of the inside mirror 11 is dark and the outside is bright, the passenger 26a of the vehicle 25 can easily check the rear of the vehicle by the half mirror 21.

When the switching switch 23c is closed by the operation of the passenger 26a, the ECU 12 transmits a motor control signal including information of a rotation angle to the motor 72. The gear 72a of the motor 72 rotates to the left only by the rotation angle, indicated by the motor control signal. With the rotation of the gear 72a, the irregular portion 73 moves to the right side, and the housing 41 rotates around the rotating shaft 56 with respect to the bracket 43. The above described rotation angle is an angle set in advance.

FIG. 12(b) shows a state in which the above described rotation operation of the housing 41 is stopped and illustrates the position of the inside mirror 11 when a video image is displayed on the monitor 22. Before and after the rotation operation, the angles of the housing 41, the half mirror 21, and the monitor 22 change upward similarly. On the other hand, the motor 72, the bracket 43, and the vehicle joint portion BS do not move before and after the rotation operation.

As described above, interlocking with display of the video image (RV, BV) on the monitor 22, the electric interlocking mechanism 23 can change the angle of the reflective surface of the half mirror 21 from the position of the half mirror 21 when the rear of the vehicle is looked at.

Similarly to the first embodiment, the interlocking mechanism 23 directs the display surface of the monitor 22 toward the passengers 26a and 26b of the vehicle 25, interlocking with display of the video image (BV, RV) on the monitor 22. Moreover, the half mirror 21 and the monitor 22 are fixed to each other in a state in which the display surface of the monitor 22 is directed toward the passengers 26a and 26b of the vehicle 25, and the reflective surface of the half mirror 21 is directed toward the upper direction or the lower direction than the angle when the rear of the vehicle is looked at.

Figure 14:
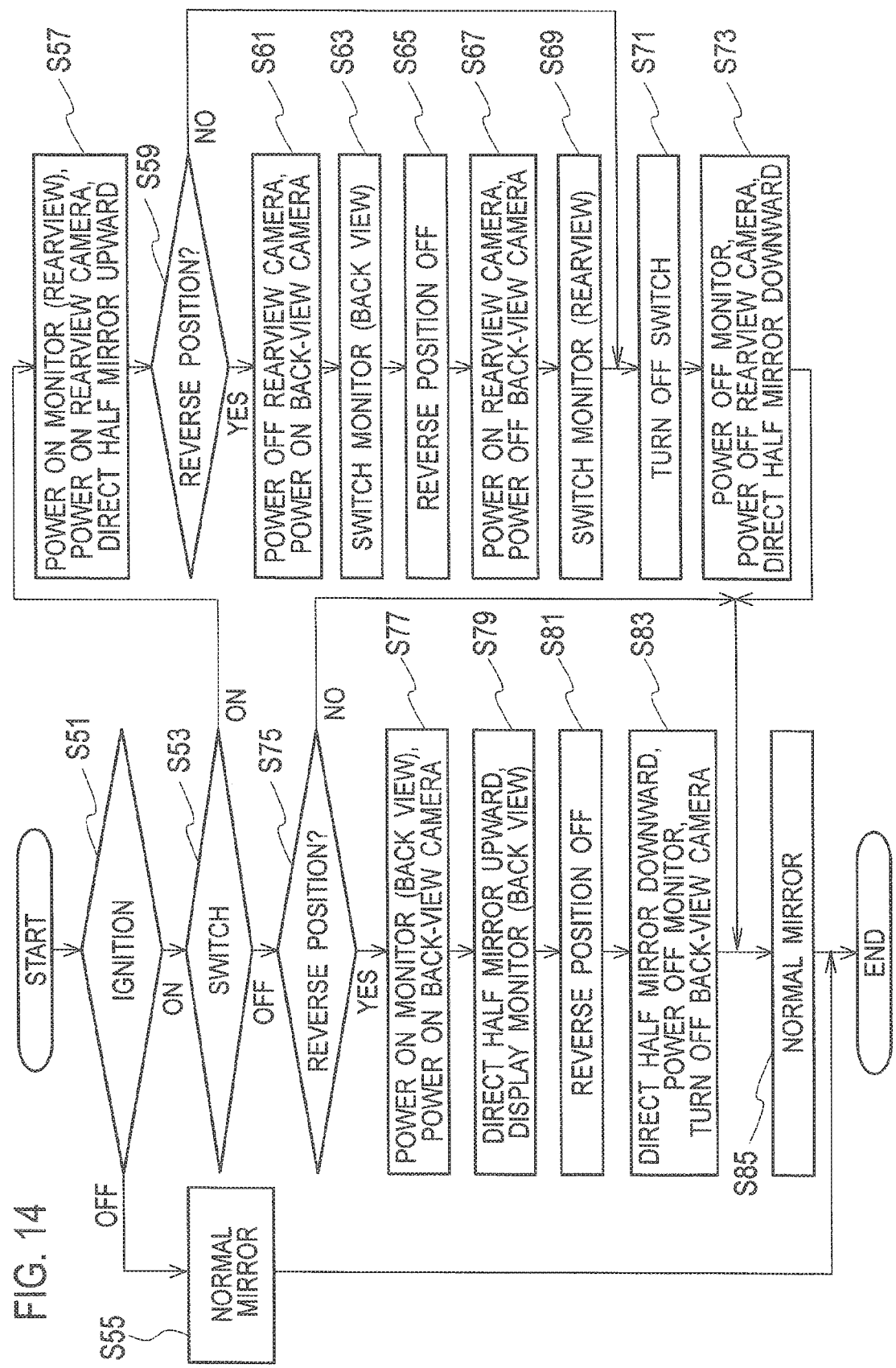
FIG. 14 is a flowchart illustrating an operation example of the video display mirror system according to the second embodiment.

By referring to FIG. 14, an operation example of the video display mirror system according to a second embodiment will be described. First, if ignition is in the off state (OFF at S51), the inside mirror 11 is used as a normal mirror in the state illustrated in FIG. 12(a) (S55). That is, a video image is not displayed on the monitor 22, and the rear view of the vehicle 25 is reflected by the half mirror 21 to the passenger 26a of the vehicle 25.

If the ignition is in the on state (ON at S51), the process proceeds to S53 step, and if the switching switch 23c is in an open state (OFF at S53), the process proceeds to S75 step. Then, if the transmission is at the reverse position (YES at S75), the ECU 12 starts the back-view camera 13b and the monitor 22 and displays the back view BV on the monitor 22 (S77). After the back-view camera 13b and the monitor 22 are started, the ECU 12 drives the motor 72 and brings the inside mirror 11 into a state illustrated in FIG. 12(b). As a result, the reflective surface of the half mirror 21 can be directed upward (S79). Subsequently, if the transmission provided in the vehicle 25 leaves the reverse position (S81), the ECU 12 turns off the power of the monitor 22 and the back-view camera. 13b. Thus, a video image is not displayed on the monitor 22. Moreover, the ECU 12 drives the motor 72 and returns the inside mirror 11 to a state illustrated in FIG. 12(a). As a result, the inside mirror 11 returns to the position of the half mirror 21 when the rear of the vehicle is looked at (S83). Subsequently, the inside mirror 11 is used as a normal mirror (S85).

On the other hand, if the passenger 26a performs an operation of closing the switching switch 23c (ON at S53), the ECU 12 starts the rearview camera 13a and the monitor 22 and displays the rearview RV on the monitor 22. Then, the ECU 12 drives the motor 72 and moves the inside mirror 11 to the state illustrated in FIG. 12(b) (S57). Subsequently, if the transmission comes to the reverse position (YES at S59), the reverse signal RS is inputted to the ECU 12, and the ECU 12 turns off the power of the rearview camera 13a and starts the back-view camera 13b (S61). After the back-view camera 13b is started, a video image displayed on the monitor 22 is switched from the rearview RV to the back view BV (S63). Subsequently, if the transmission leaves the reverse position (S65), the ECU 12 turns off the power of the back-view camera 13b and starts the rearview camera 13a (S67). After the rearview camera 13a is started, a video image displayed on the monitor 22 is switched from the back view BV to the rearview RV (S69).

Subsequently, if the passenger 26a performs an operation of opening the switching switch 23c (S71), the ECU 12 turns off the power of the monitor 22 and the rearview camera 13a, drives the motor 72, and returns the inside mirror 11 to the state illustrated in FIG. 12(a) (S73). Subsequently, the inside mirror 11 is used as a normal mirror (S85).

As described above, according to the second embodiment, the following working effects can be obtained.

Interlocking with display of a video image (BV, RV) on the monitor 22, the angle of the reflective surface of the half mirror 21 is changed from the position of the half mirror 21 when the rear of the vehicle is looked at. As a result, the amount of light from the rear of the vehicle reflected by the half mirror 21 toward the passengers 26a and 26b of the vehicle 25 decreases. Thus, cumbersomeness the passengers 26a and 26b of the vehicle 25 feel by the light reflected by the half mirror 21 decreases, and visibility of the video image (BV, RV) displayed on the monitor 22 is improved. Thus, the light amount of the monitor 22 can be kept lower than the existing technology.

The interlocking mechanism 23 interlocks with display of the video image (BV, RV) on the monitor 22 and directs the display surface of the monitor 22 toward the passengers 26a and 26b of the vehicle 25, and whereby visibility of the video image displayed on the monitor 22 is further improved.

The half mirror 21 and the monitor 22 are fixed to each other in a state in which the display surface of the monitor 22 is directed toward the passengers 26a and 26b of the vehicle 25 and also, the reflective surface of the half mirror 21 is directed toward the upper direction or the lower direction than the angle when the rear of the vehicle is looked at. The interlocking mechanism 23 can direct the reflective surface of the half mirror 21 to the upper direction or the lower direction than the angle when the rear of the vehicle is looked at and at the same time, can direct the display surface of the monitor 22 toward the passengers 26a and 26b of the vehicle 25. Thus, angle control of the half mirror 21 and the monitor 22 by the interlocking mechanism 23 is made easier.

The ECU 12 switches the type of the video image (BV, RV) to be displayed on the monitor 22 depending on whether or not the transmission mounted on the vehicle 25 is at the reverse position. As a result, the optimal video image (BV, RV) can be displayed in accordance with the shift position of the transmission.

If the transmission mounted on the vehicle 25 is at the reverse position, the ECU 12 displays the back view BV for detecting an obstacle when the vehicle 25 retreats on the monitor 22. If the transmission mounted on the vehicle 25 is not at the reverse position, the rearview RV for checking the following vehicle is displayed on the monitor 22. As a result, the rear video image in the vicinity of the vehicle is displayed when the vehicle 25 retreats, while the video image in a wider range on the rear of the vehicle can be displayed in the case other than that.

Since the interlocking mechanism 23 is an electric interlocking mechanism, design freedom of time from timing of display of a video image (BV, RV) on the monitor 22 until the angle of the half mirror is changed is improved.

If the transmission provided in the vehicle 25 is at the reverse position, regardless of opening/closing of the switching switch 23c, the interlocking mechanism 23 interlocks with display of the back view BV on the monitor 22 and can change the angle of the half mirror 21 from the position of the half mirror 21 when the rear of the vehicle is looked at. When the vehicle 25 retreats, visibility of a video image on the rear of the vehicle displayed on the monitor 22 is improved.

The bracket 43 is fixed to the vehicle 25, the half mirror 21 and the monitor 22 are fixed to the housing 41 at different angles, and the interlocking mechanism 23 changes the angles of the housing 41, the half mirror 21, and the monitor 22 with respect to the bracket 43. As a result, the reflective surface of the half mirror 21 can be directed toward the upper direction or the louver direction than the angle when the rear of the vehicle is looked at and at the same time, the display surface of the monitor 22 can be directed toward the passengers 26a and 26b of the vehicle 25. Thus, angle control of the half mirror 21 and the monitor 22 by the interlocking mechanism 23 is made easier.

Third Embodiment

In the first and second embodiments, the inside mirror 11 in which the bracket 43 is fixed to the front window of the vehicle 25, and the interlocking mechanism 23 changes the angles of the housing 41, the half mirror 21, and the monitor 22 with respect to the bracket 43 is described.

On the other hand, in a third embodiment, the inside mirror 11 in which the half mirror 21 and the monitor 22 are fixed to a bracket 83, the housing 41 is fixed to the front window of the vehicle 25, and the interlocking mechanism 23 changes the angles of the bracket 83, the half mirror 21, and the monitor 22 with respect to the housing 41 will be described.

Figure 2:
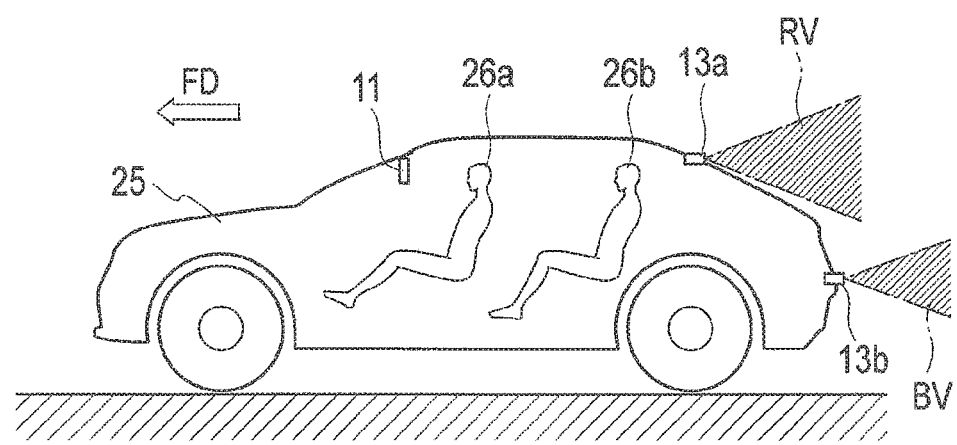
FIG. 2 is an outline diagram illustrating a vehicle on which the video display mirror system in FIG. 1 is mounted.
Figure 9:
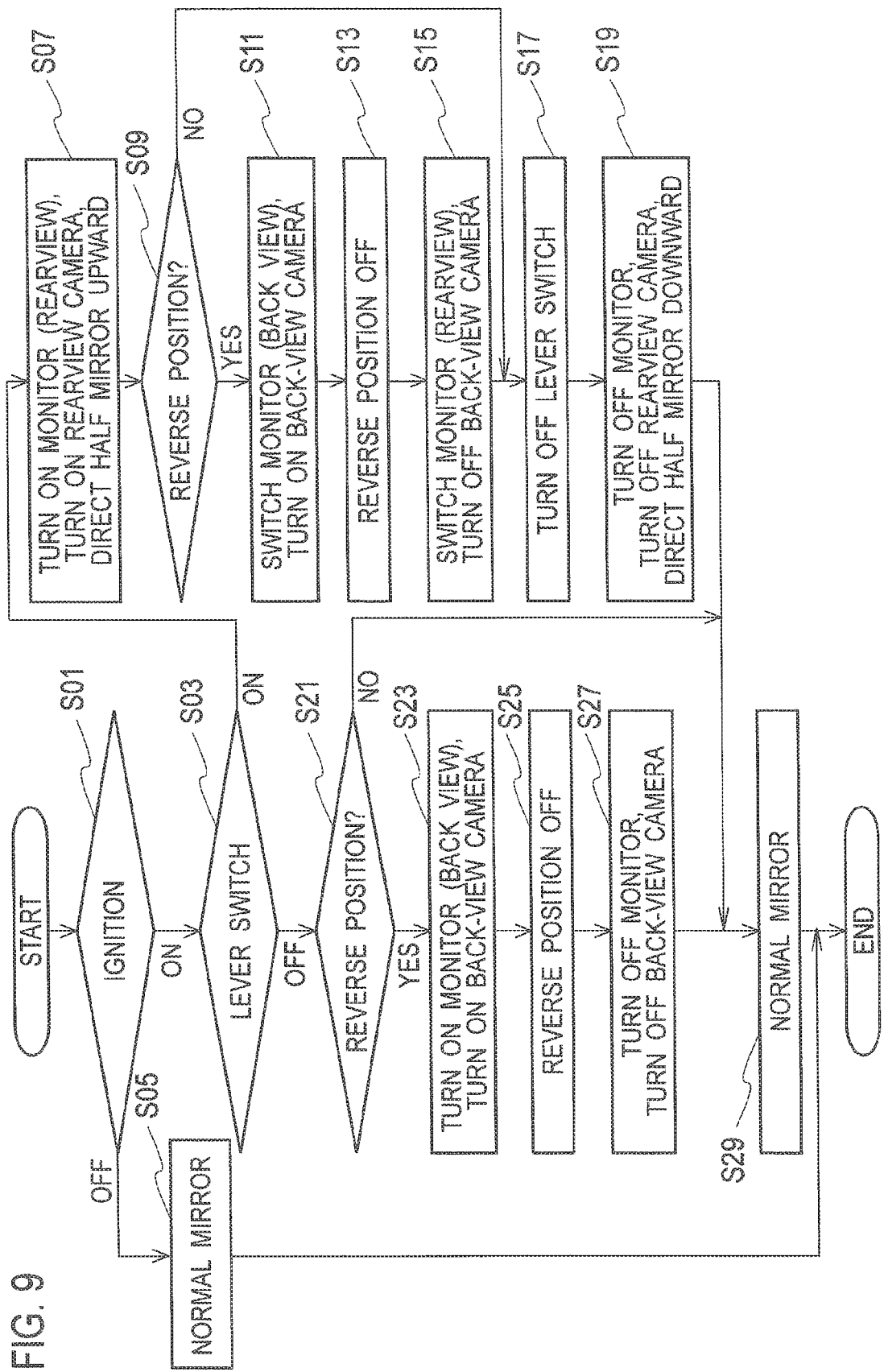
FIG. 9 is a flowchart illustrating an operation example of the video display mirror system according to the first embodiment.

The configuration of the video display mirror system illustrated in FIG. 1, the mounted example of the video display mirror system on the vehicle illustrated in FIG. 2, and the operation example of the video display mirror system illustrated in FIG. 9 are the same as those in the first embodiment, and the explanation will be omitted.

First, by referring to FIG. 15, a specific configuration example of the inside mirror 11 will be described. In FIG. 15, for ease of explanation, major constituent elements of the inside mirror 11 are illustrated in a separated state, but the inside mirror 11 is assembled by stacking the major constituent elements in the direction indicated by the arrow FD.

The inside mirror 11 includes the half mirror 21, the monitor 22 installed at the position on the vehicle front FD close to the half mirror 21, a spacer 45 sandwiched between the half mirror 21 and the monitor 22, and the housing 41 for accommodating the half mirror 21, the spacer 45, and the monitor 22. The inside mirror 11 illustrated in FIG. 15 is not provided with the lid 42 in FIG. 3.

In a state in which the reflective surface of the half mirror 21 and the display surface of the monitor 22 are directed toward a direction opposite to the traveling direction FD, the half mirror 21, the spacer 45, and the monitor 22 are overlapped and bonded by an adhesive. The spacer 45 is a frame having a rectangular shape and is bonded to an outer frame portion of the display surface of the monitor 22. Thus, the display surface of the monitor 22 can be looked at through the spacer 45 and the half mirror 21. Moreover, since a thickness of the spacer 45 is different in the vertical direction, the direction of the reflective surface of the half mirror 21 bonded through the spacer 45 and the direction of the display surface of the monitor 22 are different in the vertical direction. In an example illustrated in FIG. 15, the thickness of the spacer 45 on a vertically lower side is larger than the thickness of the spacer 45 on a vertically upper side. Thus, the reflective surface of the half mirror 21 is directed upward from the display surface of the monitor 22.

A surface (back surface of the monitor 22) opposite to the display surface of the monitor 22 is bonded to the bracket 83 arranged in the housing 41. Thus, the half mirror 21 and the monitor 22 are fixed to the bracket 83 at angles different from each other. Moreover, a thickness of the bracket 83 is different in the vertical direction. In the example illustrated in FIG. 15, the thickness of the bracket 83 on the vertically lower side is smaller than the thickness of the bracket 83 on the vertically upper side. If a normal line of the surface (surface directed toward the traveling direction FD) of the bracket 83 is directed toward the horizontal direction, the normal line of the back surface (surface in a direction opposite to the traveling direction FD) of the bracket 83 is directed downward from the horizontal direction.

From both side surfaces of an upper part of the bracket 83, the pair of rotating shafts 56 protrude in the vehicle width direction. Inside the housing 41, the rotation guide portions 54a and 54b are formed. The bracket 83 is supported rotatably by the pair of rotating shafts 56 and the rotation guide portions 54a and 54b with respect to the housing 41. On a lower part of the bracket 83, too, a pair of rotating shafts 157 protrude in the vehicle width direction. The pair of rotating shafts 157 are supported rotatably by a bearing 83b of the lever switch 44 which will be described later.

The lever switch 44 has a lever portion 44b offered for an operation of the passenger 26a and a bearing extending material portion 44d forming the above described bearing 83b of the lever switch 44. At a tip end of the bearing extending material portion 44d, the bearing 83b into which the rotating shaft 157 of the bracket 43 is inserted is formed. The rotating shaft 157 is rotatably supported by the bearing 83b of the lever switch 44. From both side surfaces of the bearing extending material portion 44d, the pair of rotating shafts 58 to the housing 41 protrude in the vehicle width direction. In the housing 41, the rotation guide portions 55a and 55b are formed. The lever switch 44 is rotatably supported by the pair of rotating shafts 58 and the rotation guide portions 55a and 55b with respect to the housing 41. The bearing 83b of the lever switch 44 is formed larger than the rotating shaft 157 so that the rotating shaft 157 of the bracket 83 can move in parallel in the hearing 83b.

As illustrated in FIG. 16, on a C-C cross section in FIG. 15, the thickness of the upper part of the spacer 45 arranged between the monitor 22 and the half mirror 21 is smaller than the thickness of the lower part of the spacer 45. Thus, the display surface of the monitor 22 and the reflective surface of the half mirror 21 are fixed forming different angles. Specifically, the reflective surface of the half mirror 21 is inclined upward from the display surface of the monitor 22.

Figure 17A:
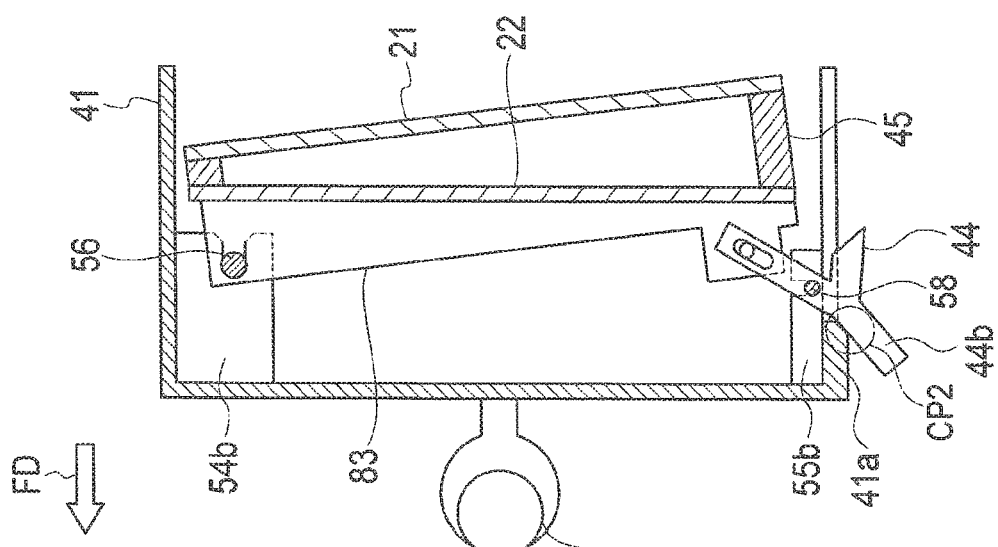
Figure 17B:
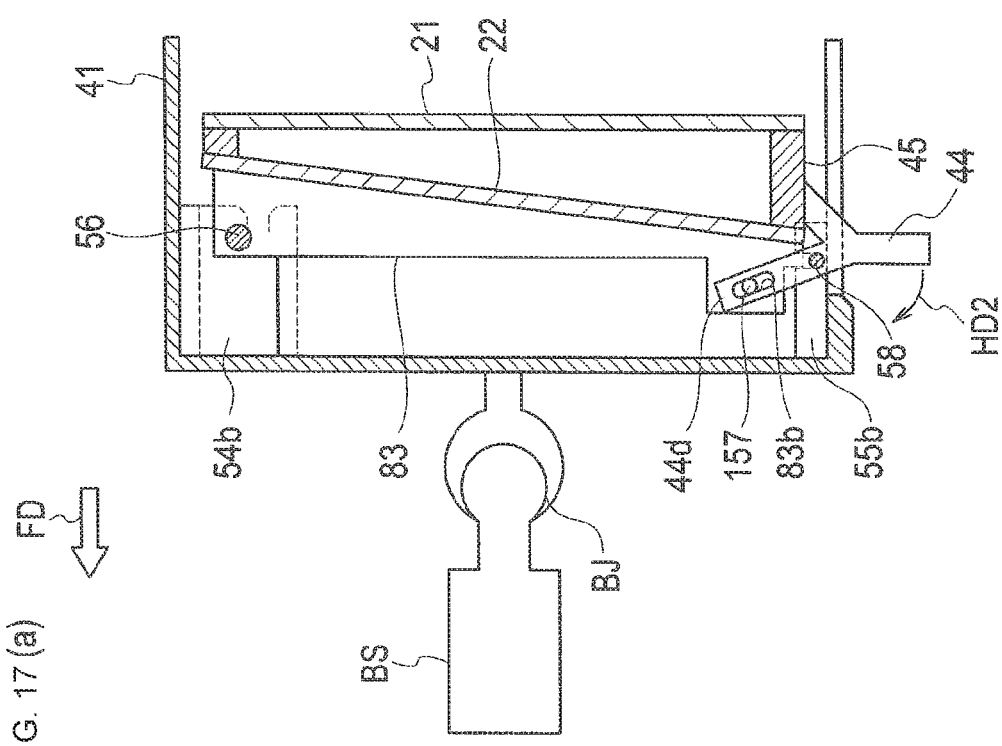

Subsequently, by referring to FIG. 17(a) and FIG. 17(b), a motion of the inside mirror 11 by the operation of the lever switch 44 and on/off control of the contact switch 23a will be described. FIG. 17(a) and FIG. 17(b) are sectional views along a D-D cross section in FIG. 15. The housing 41 is connected to the vehicle joint portion BS through the ball joint BF. The vehicle joint portion BS is fixed to the vicinity of a center on an upper part of the front window of the vehicle 25, for example.

FIG. 17(a) illustrates a position of the inside mirror 11 when the passenger 26a looks at the rear view reflected by the half mirror 21. In a state illustrated in FIG. 17(a), the rear view of the vehicle 25 to the passenger 26a of the vehicle 25 is projected to the half mirror 21 and a video image is not displayed on the monitor 22. Thus, the inside of the inside mirror 11 is dark and the outside is bright and thus, the passenger 26a of the vehicle 25 can easily check the rear of the vehicle by the half mirror 21.

The passenger 26a of the vehicle 25 operates the lever switch 44 in FIG. 17(a) to a direction HD2 which is the same as the vehicle traveling direction FD. Then, the lever switch 44 rotates around the pair of rotating shafts 58 to the right with respect to the housing 41. At the same time, the lever-itch 44 rotates around the rotating shaft 157 to the right also with respect to the bracket 83, and the bracket 83 rotates to the left around the rotating shaft 56 with respect to the housing 41. As indicated by reference character CP2 in FIG. 17(b), when the lever portion 44b of the lever switch 44 is brought into contact with the lower end portion 41a of the housing 41, each of the above described rotation operations is stopped, and at the same time, the contact switch 23a formed on the lower end portion 41a of the housing 41 is closed. When the contact switch 23a is closed, a video image is displayed on the monitor 22.

FIG. 17(b) shows a state in which the above described rotation operation is stopped and illustrates the position of the inside mirror 11 when a video image is displayed on the monitor 22. Before and after the rotation operation, the angles of the bracket 83, the half mirror 21, the spacer 45, and the monitor 22 are changed upward similarly. On the other hand, the housing 41, the ball joint BJ, and the vehicle joint portion BS do not move before and after the rotation operation.

In the first and second embodiments, angles of the housing 41 and the half mirror 21 and the monitor 22 fixed to the housing 41 are changed upward by the operation of the lever switch 44. On the other hand, the third embodiment is different in that by the operation of the lever switch 44, the angles of the bracket 83 and the half mirror 21 and the monitor 22 fixed to the bracket 83 are changed upward.

Moreover, since the operation direction of the lever switch 44 is different, the third embodiment is also different in that the contact switch 23a provided in the interlocking mechanism 23 is formed not on the lower end p(of the bracket 83 but on the lower end portion 41a of the housing 41.

As described above, the interlocking mechanism 23 interlocks with display of a video image on the monitor 22 and can change the angle of the reflective surface of the half mirror 21 from the position of the half mirror 21 when the rear of the vehicle is looked at. If the passenger 26a pushes the lever switch 44 in FIG. 17(a) to the traveling direction FD, the bracket 83, the half mirror 21, and the monitor 22 incline upward by a hinge structure. Moreover, by closing of the contact switch 23a at the same time, the cameras 13a and 13b and the monitor 22 are started, and a video image is displayed on the monitor 22. At this time, the half mirror 21 is directed upward so as to prevent a double image by eliminating reflection.

Figure 18:
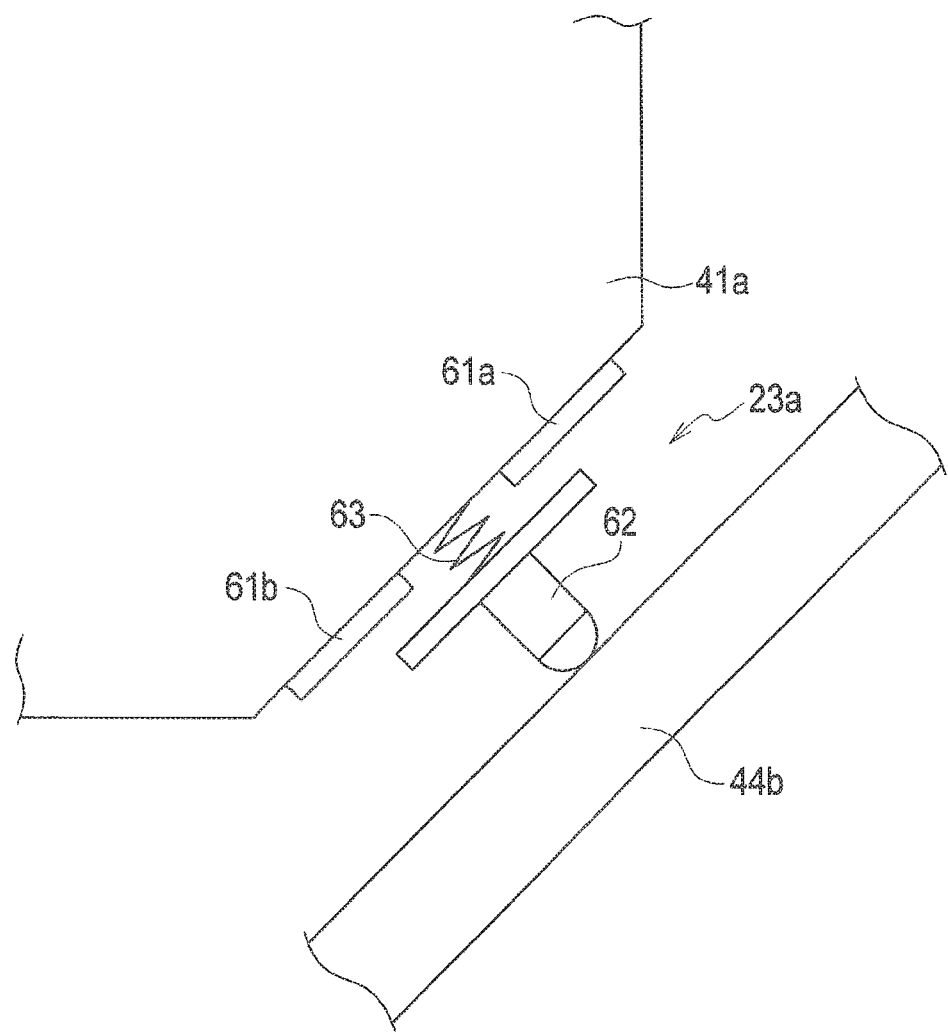
FIG. 18 is a sectional view illustrating configurations of a lever portion 44b of the lever switch 44 and the contact switch 23a formed on a lower end portion 41a of a housing 41.

FIG. 18 is a sectional view enlarging a portion indicated by a reference character CP2 in FIG. 17(b) and illustrates a configuration of the contact switch 23a formed on the lower end portion 41a of the housing 41. As described above, FIG. 18 is different from FIG. 6 in that the contact switch 23a is formed on the lower end portion 41a of the housing 41 and the lever portion 44b of the lever switch 44 presses the movable contact 62 in the state of FIG. 17(b), but the configuration of the contact switch 23a is the same as in FIG. 6, and the explanation will be omitted.

Figure 19:
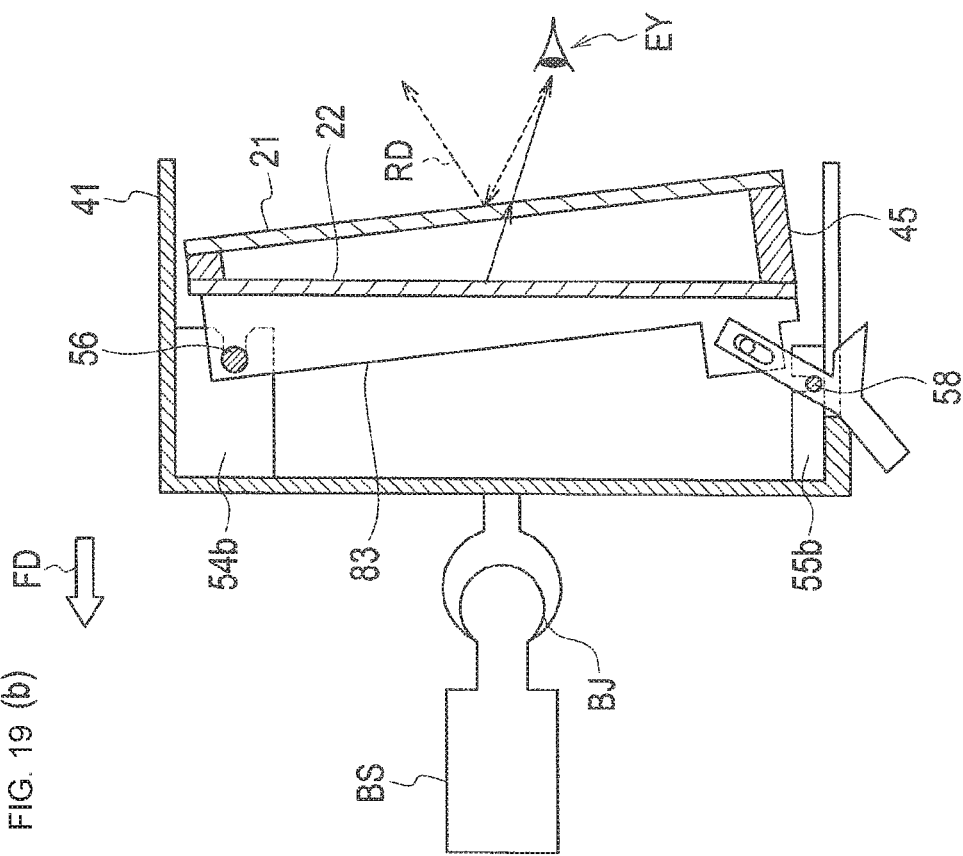
FIG. 19(a) and FIG. 19(b) are diagrams corresponding to FIG. 17(a) and FIG. 17(b), respectively, for explaining an effect by the third embodiment of the present invention.
Figure 19:
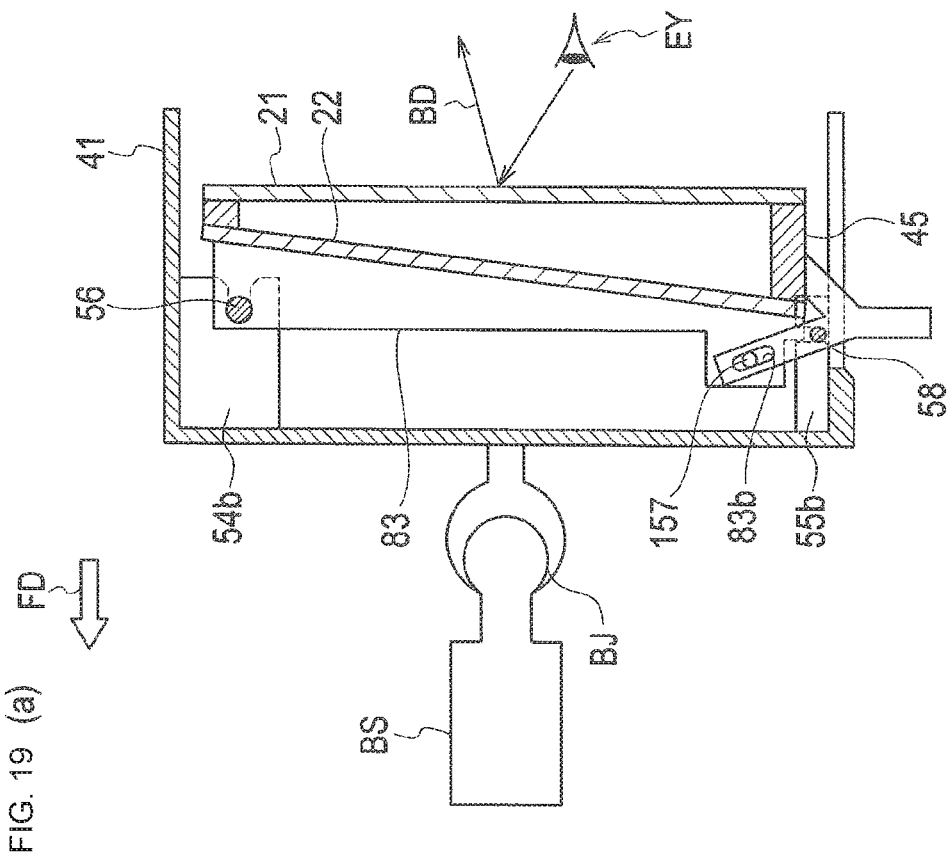

As illustrated in FIG. 19(a), in the state of FIG. 17(a), since the eye line extended from the eye EY of the passenger 26a is directed toward the rear view BD, the rear view of the vehicle 25 is projected to the half mirror 21 with respect to the passenger 26a of the vehicle 25, and an amount of light reflected by the half mirror 21 toward the passenger 26a of the vehicle 25 becomes large in this state. In the state of FIG. 17(a), since the contact switch 23a is open, no video image is displayed on the monitor 22, and the monitor 22 looks dark. Thus, since the inside of the inside mirror 11 is dark and the outside is bright, the passenger 26a of the vehicle 25 can easily check the rear view by the half mirror 21.

On the other hand, as illustrated in FIG. 19(b), in the state of FIG. 17(b), since the bracket 83, the half mirror 21, the spacer 45, and the monitor 72 are directed upward, the eye line extended from the eye EY of the passenger 26a is directed toward a roof direction RD in the cabin. Thus, the amount of light reflected by the half mirror 21 toward the passenger 26a of the vehicle 25 decreases as compared with the state of FIG. 17(a). In the state of FIG. 17(b), since the contact switch 23a is closed, a video image is displayed ran the monitor 22. Thus, since a state in which the inside of the inside mirror 11 is bright and the outside is dark is formed, the passenger 26a of the vehicle 25 no longer feels cumbersomeness by the light reflected by the half mirror 21, and visibility of the video image displayed on the monitor 22 is improved. As a result, a light amount of the monitor 22 can be kept lower than by an existing technology.

Moreover, in the state of FIG. 17(b), interlocking with display of a video image on the monitor 22, the display surface of the monitor 22 can be directed toward the passenger 26a of the vehicle 25. As a result, visibility of the video image displayed on the monitor 22 is further improved. For example, it is only necessary to direct the display surface of the monitor 22 perpendicularly to the passenger 26a of the vehicle 25. Since an angle of the display surface of the monitor 22 which improves visibility of the video image is different depending on characteristics of the monitor 22, directing perpendicularly is not limiting, and the display surface may be directed toward an angle at which the visibility of the video image is improved.

Moreover, the half mirror 21 and the monitor 22 can be fixed to each other in a state in which the display surface of the monitor 22 is directed toward the passenger 26a of the vehicle 25, and the reflective surface of the half mirror 21 is directed toward the upper direction (the roof direction RD, for example) than an angle when the rear of the vehicle is looked at. The interlocking mechanism 23 can direct the reflective surface of the half mirror 21 to the upper direction than the angle when the rear of the vehicle is looked at and at the same time, can direct the display surface of the monitor 22 toward the passenger of the vehicle by changing the angles of the reflective surface of the half mirror 21 and the display surface of the monitor 22 at the same time. Thus, angle control of the half mirror 21 and the monitor 22 by the interlocking mechanism 23 is made easier.

Alternatively, the half mirror 21 and the monitor 22 can be fixed to each other in a state in which the display surface of the monitor 22 is directed toward the passenger 26a of the vehicle 25, and the reflective surface of the half mirror 21 is directed toward the lower direction (the floor direction, for example) than the angle when the rear of the vehicle is looked at. In this case, the interlocking mechanism 23 can direct the reflective surface of the half mirror 21 to the lower direction than the angle when the rear of the vehicle is looked at and at the same time, can direct the display surface of the monitor 22 toward the passenger of the vehicle by changing the angles of the reflective surface of the half mirror 21 and the display surface of the monitor 22 to the lower direction at the same time. For example, the state illustrated in FIG. 17(a) and the state illustrated in FIG. 17(b) can be switched in practice.

Moreover, as described above, in the third embodiment, since the configuration of the video display mirror system illustrated in FIG. 1 is common to that of the first embodiment, a modified example similar to the modified example of the video display mirror system described by referring to FIG. 10 is possible.

As described above, according to the third embodiment, the following working effects can be obtained.

Interlocking with display of a video image (BV, RV) on the monitor 22, the angle of the reflective surface of the half mirror 21 is changed from the position of the half mirror 21 when the rear of the vehicle is looked at. As a result, the amount of light from the rear of the vehicle 25 reflected by the half mirror 21 toward the passengers 26a and 26b of the vehicle decreases. Thus, cumbersomeness the passengers 26a and 26b of the vehicle 25 feel by the light reflected by the half mirror 21 decreases, and visibility of the video image (BV, RV) displayed on the monitor 22 is improved.

Thus, the light amount of the monitor 22 can be kept lower than by the existing technology.

The interlocking mechanism 23 interlocks with display of the video image (BV, RV) on the monitor 22 and directs the display surface of the monitor 22 toward the passengers 26a and 26b of the vehicle 25, and whereby visibility of the video image displayed on the monitor 22 is further improved.

The half mirror 21 and the monitor 22 are fixed to each other in a state in which the display surface of the monitor 22 is directed toward the passengers 26a and 26b of the vehicle 25 and also, the reflective surface of the half mirror 21 is directed toward e upper direction or the lower direction than the angle when the rear of the vehicle is looked at. The interlocking mechanism 23 can direct the reflective surface of the half mirror 21 to the upper direction or the lower direction than the anile when the rear of the vehicle is looked at and at the same time, can direct the display surface of the monitor 22 toward the passengers 26a and 26b of the vehicle 25. Thus, angle control of the half mirror 1 and the monitor 22 by the interlocking mechanism 23 is made easier.

The ECU 12 switches the type of the video image (BV, RV) to be displayed on the monitor 22 depending on whether or not the transmission mounted on the vehicle 25 is at the reverse position. As a result, the optimal video image (BV, RV) can be displayed in accordance with the shift position of the transmission.

If the transmission mounted on the vehicle 25 is at the reverse position, the ECU 12 displays the back view BV for detecting an obstacle when the vehicle 25 retreats on the monitor 22, and if the transmission mounted on the vehicle 25 is not at the reverse position, the rearview RV for checking the following vehicle is displayed on the monitor 22. As a result, the rear video image in the vicinity of the vehicle is displayed when the vehicle 25 retreats, while the video image in a wider range on the rear of the vehicle can be displayed in the case other than that.

The interlocking mechanism 23 includes the contact switch 23a switched to on/off in accordance with the angle of the half mirror 21, and controls display and non-display of the video image (BV, RV) in accordance with on/off of the contact switch 23a. As a result, since the interlocking mechanism 23 can be mechanically constituted, reliability of the interlocking mechanism 23 is improved.

When the transmission provided in the vehicle 25 is at the reverse position, regardless of opening/closing of the contact switch 23a, the interlocking mechanism 23 interlocks with display of the back view BV on the monitor 22 and can change the angle of the half mirror 21 from the position of the half mirror 21 when the rear of the vehicle is looked at. When the vehicle 25 retreats, visibility of the video image of the rear of the vehicle displayed on the monitor 22 is improved.

The housing 41 is fixed to the vehicle 25, the half mirror 21 and the monitor 22 are fixed to the bracket 83 at different angles, and the interlocking mechanism 23 changes the angles of the bracket 83, the half mirror 21, and the monitor 22 with respect to the housing 41. As a result, the reflective surface of the half mirror 21 can be directed toward the upper direction or the lower direction than the angle when the rear of the vehicle is looked at and at the same time, the display surface of the monitor 22 can be directed toward the passengers 26a and 26b of the vehicle 25. Thus, angle control of the half mirror 21 and the monitor 22 by the interlocking mechanism 23 is made easier.

Fourth Embodiment

In a fourth embodiment, instead of the manual interlocking mechanism 23 described in the third embodiment, a video display mirror using an electric interlocking mechanism and a video display mirror system will be described. A configuration of the video display mirror system according to the fourth embodiment is the same as in FIG. 11, and an operation example of the video display mirror system according to the fourth embodiment is the same as in FIG. 14, and the explanation will be omitted, respectively.

By referring to FIG. 20(a) and FIG. 20(b), a motion of the inside mirror 71 by driving of the motor 72 will be described. FIG. 20(a) and FIG. 20(b) are diagrams corresponding to sectional views along the D-D cross section in FIG. 15. Instead of the lever switch 44, the motor 72 is accommodated inside the housing 41. The motor 72 is fixed to a lower part on the back surface (surface directed toward the traveling direction FD) of the bracket 83.

The motor 72 is installed so that its rotating shaft is directed toward the horizontal direction, and the gear 72a is provided on the rotating shaft of the motor 72. On a lower end portion of the housing 41, the irregular portion 73 is formed so as to mesh with the gear 72a. The irregular portion 73 is formed into an arc shape around the rotating shaft 56.

FIG. 20(a) illustrates the position of the inside mirror 11 when the passenger 26a looks toward the rear view reflected by the half mirror 21. In a state illustrated in FIG. 20(a), the rear view of the vehicle 25 is projected to the half mirror 21 to the passenger 26a of the vehicle 25, and a video image is not displayed on the monitor 22. Thus, since the inside of the inside mirror 11 is dark and the outside is bright, the passenger 26a of the vehicle 25 can easily check the rear of the vehicle by the half mirror 21.

When the switching switch 23c in FIG. 11 is closed by the operation of the passenger 26a, the ECU 12 transmits a motor control signal including information of a rotation angle to the motor 72. The gear 72a of the motor 72 rotates to the right by the rotation angle indicated by the motor control signal. With the rotation of the gear 72a, the bracket 83, the monitor 22, the spacer 45, and the half mirror 21 rotate around the rotating shaft 56 with respect to the housing 41. The above described rotation angle is an angle set in advance.

FIG. 20(b) shows a state in which the above described rotation operation of the housing 41 is stopped and illustrates the position of the inside mirror 11 when a video image is displayed on the monitor 22. Before and after the rotation operation, the angles of the bracket 83, the half mirror 21, the spacer 45, and the monitor 22 change upward similarly. On the other hand, the housing 41 and the vehicle joint portion BS do not move before and after the rotation operation.

As described above, interlocking with display of the video image (RV, BV) on the monitor 22, the electric interlocking mechanism 23 can change the angle of the reflective surface of the half mirror 21 from the position of the half mirror 21 when the rear of the vehicle is looked at.

As described above, according to the fourth embodiment, the following working effects can be obtained.

Interlocking with display of the video image (BV, RV) on the monitor 22, an angle of the reflective surface of the half mirror 21 is changed from the position of the half mirror 21 when the rear of the vehicle is looked at. As a result, the amount of light from the rear of the vehicle reflected by the half mirror 21 toward the passengers 26a and 26b of the vehicle 25 decreases. Thus, cumbersomeness the passengers 26a and 26b of the vehicle 25 feel by the light reflected by the half mirror 21 decreases, and visibility of the video image (BV, RV) displayed on the monitor 22 is improved.

Thus, the light amount of the monitor 22 can be kept lower than by the existing technology.

The interlocking mechanism 23 interlocks with display of the video image (BV, RV) on the monitor 22 and directs the display surface of the monitor 22 toward the passengers 26a and 26b of the vehicle 25 so that visibility of the video image displayed on the monitor 22 is further improved.

The half mirror 21 and the monitor 22 are fixed to each other in a state in which the display surface of the monitor 22 is directed toward the passengers 26a and 26b of the vehicle 25, and the reflective surface of the half mirror 21 is directed toward the upper direction or the lower direction than the angle when the rear of the vehicle is looked at. The interlocking mechanism 23 directs the reflective surface of the half mirror 21 to the upper direction or the lower direction than the angle when the rear of the vehicle is looked at and at the same time, can direct the display surface of the monitor 22 toward the passengers 26a and 26b of the vehicle 25. Thus, angle control of the half mirror 21 and the monitor 22 by the interlocking mechanism 23 is made easier.

The ECU 12 switches the type of the video image (BV, RV) to be displayed on the monitor 22 depending on whether or not the transmission mounted on the vehicle 25 is at the reverse position. As a result, the optimal video image (BV, RV) can be displayed in accordance with a shift position of the transmission.

The ECU 12 displays the back view BV for detecting an obstacle when the vehicle 25 retreats on the monitor 22 if the transmission mounted on the vehicle 25 is at the reverse position. If the transmission mounted on the vehicle 25 is not at the reverse position, the ECU 12 displays the rearview RV for checking the following vehicle on the monitor 22. As a result, the rear video image in the vicinity of the vehicle can be displayed when the vehicle 25 retreats, while the video image in a wider range on the rear of the vehicle can be displayed in the case other than that.

Since the interlocking mechanism 23 is an electric interlocking mechanism, design freedom of time from timing of display of a video image (BV, RV) on the monitor 22 until the angle of the half mirror is changed is improved.

If the transmission provided in the vehicle 25 is at the reverse position, regardless of opening/closing of the switching switch 23c, the interlocking mechanism 23 interlocks with display of the back view BV on the monitor 22 and can change the angle of the half mirror 21 from the position of the half mirror 21 when the rear of the vehicle is looked at. When the vehicle 25 retreats, visibility of a video image on the rear of the vehicle displayed on the monitor 22 is improved.

The housing 41 is fixed to the vehicle 25, the half mirror 21 and the monitor 22 are fixed to the bracket 83 at different angles, and the interlocking mechanism 23 changes the angles of the bracket 83, the half mirror 21, and the monitor 22 with respect to the housing 41. As a result, the reflective surface of the half mirror 21 can be directed toward the upper direction or the lower direction than the angle when the rear of the vehicle is looked at and at the same time, the display surface of the monitor 22 can be directed toward the passengers 26a and 26b of the vehicle 25. Thus, angle control of the half mirror 21 and the monitor 22 by the interlocking mechanism 23 is made easier.

Modified Example

Figure 21:
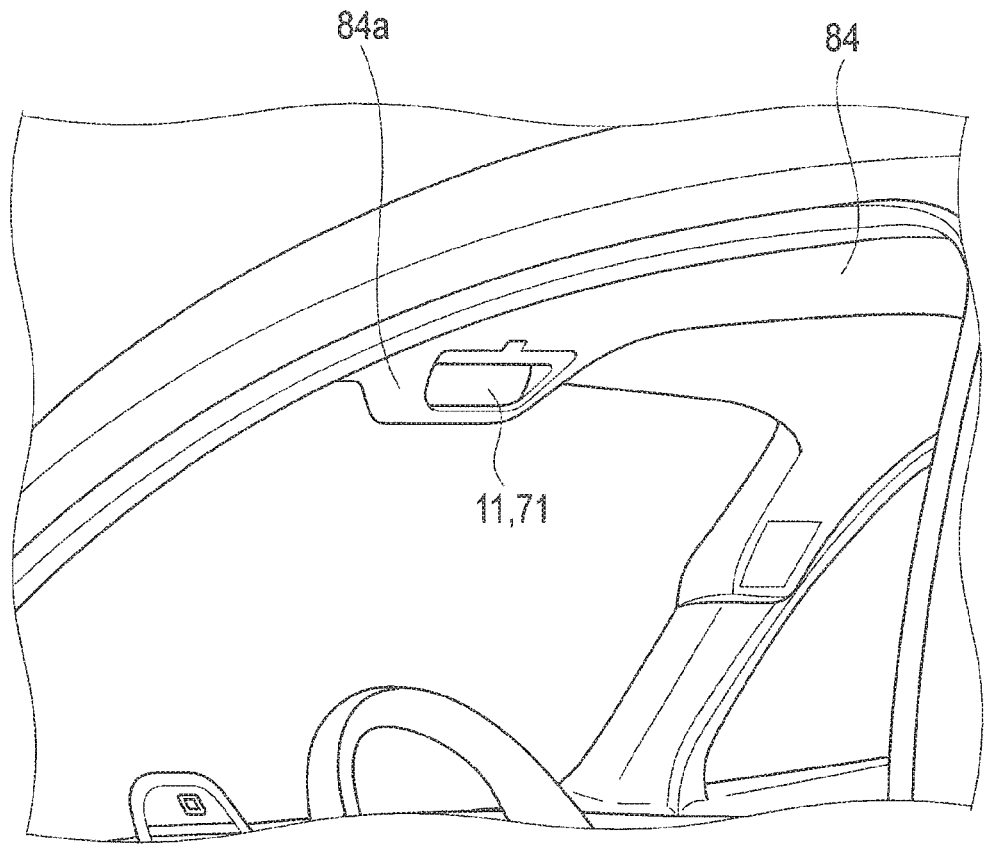
FIG. 21 is a perspective view illustrating appearances of the inside mirrors 11 and 71 according to a modified example of third and fourth embodiments.

In the third and fourth embodiments, the case in which the housing 41 is fixed to the vicinity of the center on the upper part of the front window of the vehicle 25 through the ball joint BJ and the vehicle, joint portion BS is described. The inside mirrors 11 and 71 according to the third and fourth embodiments are not limited to that. For example, the inside mirrors 11 and 71 can be embedded in a front-end center part 84a of a ceiling member 84 in the cabin as illustrated in FIG. 21. In this case, the housing 41 of the inside mirrors 11 and 71 can be directly fixed to the front-end center part 84a of the ceiling member 84 in the cabin not through the ball joint Bi and the vehicle joint portion BS. Alternatively, as the housing 41 of the inside mirrors 11 and 71, the front-end center part 84a of the ceiling member 84 in the cabin can be used.

As described above, the embodiments and their modified examples of the present invention are described, but the description and drawings constituting a part of this disclosure should not be understood to limit this invention. From this disclosure, various alternative embodiments, examples, and operation technologies will be made obvious for those skilled in the art.

For example, in the embodiments of the present invention, as an example of the video display mirror, the inside mirror 11 installed in the cabin is described, but the video display mirror includes other mirrors used for reflecting the view of the rear of the vehicle 25 such as a door mirror and a fender mirror installed outside the cabin. Interlocking with display of the video image on the monitor 22, by changing the angle of the reflective surface of the half mirror 21 from the position of the half mirror 21 when the rear of the vehicle is looked at, the amount of light reflected by the half mirror 21 decreases, and visibility of the monitor 22 is improved.

Moreover, the manual interlocking mechanism 23 and the electric interlocking mechanism 23 are described as different embodiments, but the manual interlocking mechanism 23 and the electric interlocking mechanism 23 may be combined in use. In this case, the passenger 26a can freely select between a manual operation by the lever switch 44 and an electric operation by the motor 72.

All the contents of Japanese Patent Application No. 2011-269734 (filing date: Dec. 9, 2011) and Japanese Patent Application No. 2012-132789 (filing date: Jun. 12, 2012) are incorporated by reference.

According to the video display mirror and the video display mirror system according to the embodiments of the present invention, the amount of light from the rear of the vehicle reflected by the half mirror toward the passenger of the vehicle decreases. Thus, cumbersomeness the passenger of the vehicle feels by the light reflected by the half mirror decreases, and visibility of the video image displayed on the monitor is improved. Thus, the present invention has industrial applicability.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST 11, 71 inside mirror (video display mirror)
12 ECU (video controller)
13a rearview camera
13b back-view camera
21 half mirror
22 monitor
23 interlocking mechanism 23*a* contact switch
25 vehicle
26*a*, 26*b* passenger
41 housing
43, 83 bracket
72 motor
BV back view
RV rearview

The invention claimed is:

1. A video display mirror comprising:
a half mirror used by a passenger of a vehicle for looking toward a rear of the vehicle and installed on a front of the vehicle;
a monitor installed on the front of the vehicle; and
an interlocking mechanism which is configured to interlock with display of a video image on a display surface of the monitor, to change an angle of a reflective surface of the half mirror from a position of the half mirror when the rear of the vehicle is looked at,
wherein the interlocking mechanism is configured to direct the reflective surface of the half mirror to a first direction higher or lower than a second direction that a normal line of the reflective surface has when the rear of the vehicle is looked at by the passenger,
wherein the half mirror and the monitor are arranged with inclination,
wherein a direction perpendicular to the display surface of the monitor is a direction in which an eye of the passenger is located when the reflective surface of the half mirror directs towards the first direction,
wherein, in the first direction, the rear of the vehicle is not looked at by the passenger and the video image is displayed on the display surface to the passenger,
wherein the direction perpendicular to the display surface of the monitor is not the direction in which the eye of the passenger is located when the reflective surface of the half mirror directs towards the second direction, and
wherein, in the second direction, the rear of the vehicle is looked at by the passenger and the video image is not displayed on the display surface to the passenger.

2. The video display mirror according to claim 1, further comprising:
a video controller for switching a type of the video image to be displayed on the monitor depending on whether or not a transmission mounted on the vehicle is at a reverse position.

3. The video display mirror according to claim 2, wherein the video controller displays a back view for detecting an obstacle when the vehicle retreats on the monitor if the transmission mounted on the vehicle is at the reverse position, and wherein the video controller displays a rearview for checking a following vehicle on the monitor if the transmission mounted on the vehicle is not at the reverse position.

4. The video display mirror according to claim 1, wherein the interlocking mechanism includes a contact switch switched to on/off in accordance with an angle of the half mirror and controls display and non-display of the video image in accordance with on/off of the contact switch.

5. The video display mirror according to claim 1, wherein the interlocking mechanism is an electric interlocking mechanism.

6. The video display mirror according to claim 1, further comprising:
a bracket fixed to the vehicle; and
a housing for accommodating the half mirror and the monitor,
wherein the half mirror and the monitor are fixed to the housing at angles different from each other, and
wherein the interlocking mechanism changes angles of the housing, the half mirror, and the monitor with respect to the bracket.

7. The video display mirror according to claim 1, further comprising:
a bracket to which the half mirror and the monitor are fixed at different angles; and
a housing fixed to the vehicle and accommodating the half mirror, the monitor, and the bracket,
wherein the interlocking mechanism changes angles of the bracket, the half mirror, and
the monitor with respect to the housing.

8. A video display mirror system comprising:
a video display mirror according to claim 1; and
a camera mounted on the vehicle and photographing a video image of a periphery of the vehicle;
wherein the monitor is arranged to display at least the video image imaged by the camera.

* * * * *